US007277187B2

(12) United States Patent
Smith et al.

(10) Patent No.: US 7,277,187 B2
(45) Date of Patent: Oct. 2, 2007

(54) OVERHEAD DIMENSIONING SYSTEM AND METHOD

(75) Inventors: Melvyn Lionel Smith, Berkeley (GB); Lyndon Smith, Berkeley (GB); Eve Carlsruh, Layton, UT (US)

(73) Assignee: Quantronix, Inc., Farmington, UT (US)

( * ) Notice: Subject to any disclaimer, the term of this patent is extended or adjusted under 35 U.S.C. 154(b) by 280 days.

(21) Appl. No.: 10/482,063

(22) PCT Filed: Jul. 1, 2002

(86) PCT No.: PCT/US02/20737

§ 371 (c)(1),
(2), (4) Date: Jul. 9, 2004

(87) PCT Pub. No.: WO03/002935

PCT Pub. Date: Jan. 9, 2003

(65) Prior Publication Data

US 2004/0240754 A1 Dec. 2, 2004

Related U.S. Application Data

(60) Provisional application No. 60/302,509, filed on Jun. 29, 2001.

(51) Int. Cl.
G06K 9/36 (2006.01)
G06K 9/00 (2006.01)
G01B 11/24 (2006.01)
(52) U.S. Cl. ............ 356/601; 382/141; 382/154; 356/627; 356/625; 340/928
(58) Field of Classification Search ........ 356/601–625, 356/627–628, 634–636, 640, 3.1, 4.08; 382/141, 382/170–172, 190, 103; 702/152; 250/559.22; 340/928; 235/384
See application file for complete search history.

(56) References Cited

U.S. PATENT DOCUMENTS

| 4,731,853 | A |  | 3/1988 | Hata et al. |
| 4,929,843 | A |  | 5/1990 | Chmielewski, Jr. et al. |
| 5,076,697 | A | * | 12/1991 | Takagi et al. ............... 356/603 |
| 5,193,120 | A |  | 3/1993 | Gamache et al. |

(Continued)

FOREIGN PATENT DOCUMENTS

DE 19545845 A1 6/1997

(Continued)

OTHER PUBLICATIONS

Strand, T.C., "Optical Three-Dimensional Sensing for Machine Vision," Optical Engineering, vol. 24, No. 1, Jan./Feb. 1985, pp. 033-040.

Primary Examiner—Sang H. Nguyen
(74) Attorney, Agent, or Firm—TraskBritt

(57) ABSTRACT

A system and method for dimensioning large or palletized freight of one or more pieces determines the dimensions of a rectangular prism having the smallest volume which would contain the freight. The system is capable of being positioned remotely from the freight. The system is further configured to determine the dimensions in varying levels of ambient light and varying object surface reflectance. The system still further is configured to first rapidly scan an area to determine the general location of the boundaries of the freight and then more precisely scan the determined general boundaries of the freight to determine the precise boundaries of the freight.

56 Claims, 17 Drawing Sheets

U.S. PATENT DOCUMENTS

| | | | |
|---|---|---|---|
| 5,280,542 A | | 1/1994 | Ozeki et al. |
| 5,442,462 A | * | 8/1995 | Guissin ...................... 358/463 |
| 5,555,090 A | | 9/1996 | Schmutz |
| 5,719,678 A | * | 2/1998 | Reynolds et al. ........... 356/627 |
| 5,815,274 A | * | 9/1998 | Dlugos ........................ 356/634 |
| 5,848,188 A | * | 12/1998 | Shibata et al. .............. 382/203 |
| 5,923,428 A | * | 7/1999 | Woodworth ................ 356/623 |
| 5,929,980 A | * | 7/1999 | Yamaguchi et al. ....... 356/4.03 |
| 6,044,170 A | * | 3/2000 | Migdal et al. .............. 382/154 |
| 6,072,903 A | * | 6/2000 | Maki et al. ................. 382/190 |
| 6,115,114 A | | 9/2000 | Berg et al. |
| 6,195,019 B1 | * | 2/2001 | Nagura ....................... 340/928 |
| 6,507,406 B1 | * | 1/2003 | Yagi et al. .................. 356/602 |
| 6,603,563 B1 | * | 8/2003 | Gagliano .................... 356/601 |
| 6,771,804 B1 | * | 8/2004 | Maetschke ................. 382/141 |

FOREIGN PATENT DOCUMENTS

| | | |
|---|---|---|
| EP | 0573661 A1 | 12/1993 |
| WO | WO98/05157 | 2/1998 |

* cited by examiner (-45, 45)

(-60, 60)

(-67, 67)

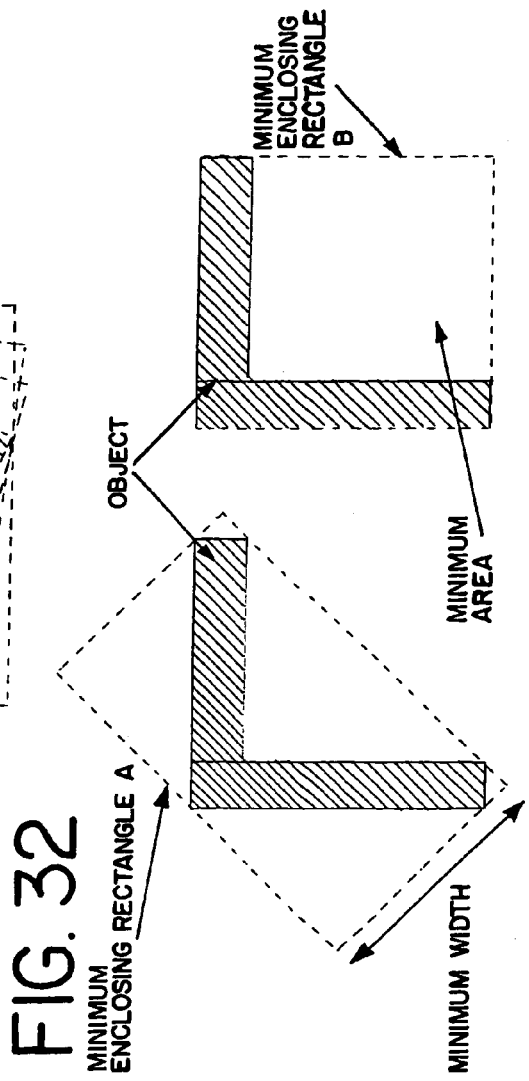
FIG. 31 ROTATION OF ENCLOSING RECTANGLE
FIG. 32 MINIMUM ENCLOSING RECTANGLE A
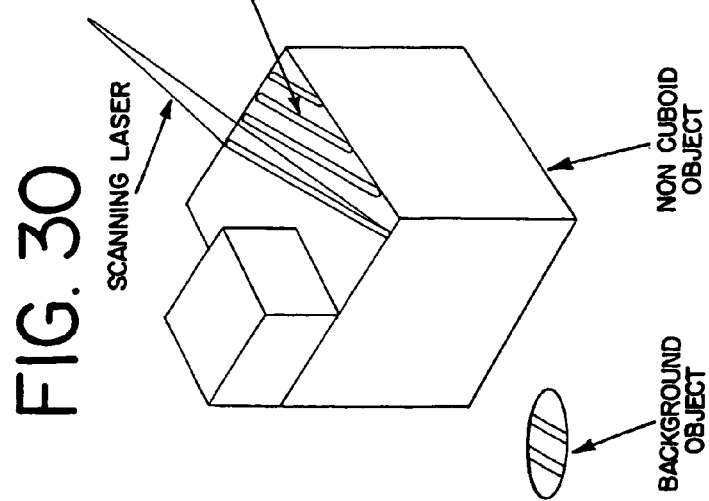
FIG. 30

OVERHEAD DIMENSIONING SYSTEM AND METHOD

CROSS-REFERENCE TO RELATED APPLICATIONS

This application claims priority to U.S. Provisional Patent Application entitled "Overhead Dimensioning System," Ser. No. 60/302,509, filed Jun. 29, 2001, the contents of which are incorporated herein by reference.

BACKGROUND OF THE INVENTION

1. Field of the Invention

The present invention relates to a machine vision system for dimensioning large or palletized freight of one or more pieces.

2. State of the Art

Systems for visually dimensioning objects are generally well known. See, for example, U.S. Pat. Nos. 4,731,853; 5,193,120; 4,929,843; 5,280,542; and 5,555,090, and "Optical Three-Dimensional Sensing for Machine Vision," T. C. Strand, Optical Engineering, Vol. 24, No. 1, pp. 33-40. Such systems scan the object and the surrounding surface with a laser, and detect the laser reflected off of the scanned object, as well as off the surrounding surface, with a CCD camera. The detected laser image is analyzed to determine the dimensions of the object via triangulation.

Such systems for dimensioning objects have required a level of environmental structuring that has limited the potential application of automated dimensioning. In particular, such systems have been limited to substantially cuboidal objects and/or objects in known positions and, thus, have been unable to tolerate objects having highly noncuboidal shapes. Most often, limitations on the range of object size in relation to measurement resolution/accuracy have been imposed. In operation, these systems have been slow or awkward to use. Generally, the systems have been intolerant to variations in object reflectance, within or between objects, and/or ambient lighting. In order to reduce occlusion, such systems typically utilize movement, i.e., rotation, of the object and/or the sensing device, or require optical components to be located at the level of the object rather than being positioned remotely overhead. Finally, the common dimensioning systems have required costly hardware. The present invention is provided to solve these and other problems.

BRIEF SUMMARY OF THE INVENTION

The present invention includes a method for determining the dimensions of an item placed within a measurement space of a dimensioning system and a measuring system and a computer-readable medium configured to implement the inventive method. The components of the dimensioning system may be mounted remotely overhead and are configured to minimize occlusion to recover the true dimensions of the object. The method includes scanning a signal through a measurement space. The acquired images are optically filtered and differenced to isolate the signal. A first laser and a first camera are utilized to determine an approximate location and dimension of the item. A second laser and a second camera are utilized to determine an approximate location and dimension of the item. A first set of point cloud data is acquired wherein the first laser scans a first signal through the measurement space and the first camera receives the reflections of the first signal. A second set of point cloud data is acquired wherein the second laser scans a second signal through the measurement space and the second camera receives the reflections of the second signal. A third set of point cloud data is acquired wherein the first laser scans the first signal through the measurement space and the second camera receives the reflections of the first signal. A fourth set of point cloud data is acquired wherein the second laser scans the second signal through the measurement space and the first camera receives the reflections of the second signal. An image is constructed by merging the first, second, third and fourth sets of acquired point cloud data. A smallest rectangular prism, e.g., cuboid, rectangular parallelepiped, is determined to contain the constructed image.

A further aspect of the present invention includes utilizing an image point connection factor. The image point correction factor is determined during calibration of the dimensioning system and includes a set of generated equations or lookup tables to correct lens distortion. The distortion corrections are utilized in cooperation with the constructed image to determine the cuboid.

Yet a further aspect of the present invention incorporates a rapid scanning technique wherein a first, coarse, scan quickly locates an object and, once located, a second, fine, scan is utilized to dimension the object. Alternatively, an adaptive scanning technique is utilized using both coarse and fine scans to locate and dimension the object.

Yet another aspect of the present invention includes acquiring additional sets of point cloud data and constructing the image by merging all the sets of acquired point cloud data.

One advantage of the present invention includes providing a dimensioning system wherein the working component(s) of the system are mounted remotely, e.g. overhead, to allow unobstructed passage throughout the measurement space.

Another advantage of the present invention includes providing a system for dimensioning large or palletized freight of one or more pieces.

Yet another advantage of the present invention includes providing a dimensioning system capable of being installed within existing operational environments.

In accordance with the present invention. the system can determine the dimensions of a rectangular prism having the smallest volume but which would contain the freight.

In further accordance with the present invention, the system can determine the dimensions in varying levels of ambient light and varying object surface reflectance.

BRIEF DESCRIPTION OF THE DRAWINGS

FIG. 30 is a schematic diagram showing the accumulated laser scan lines of a noncuboid object;

FIG. 31 is a block diagram depicting one method of determining a minimum enclosing rectangle;

FIG. 32 is a block diagram depicting another method of determining a minimum enclosing rectangle;

DETAILED DESCRIPTION OF THE INVENTION

Figure 1:
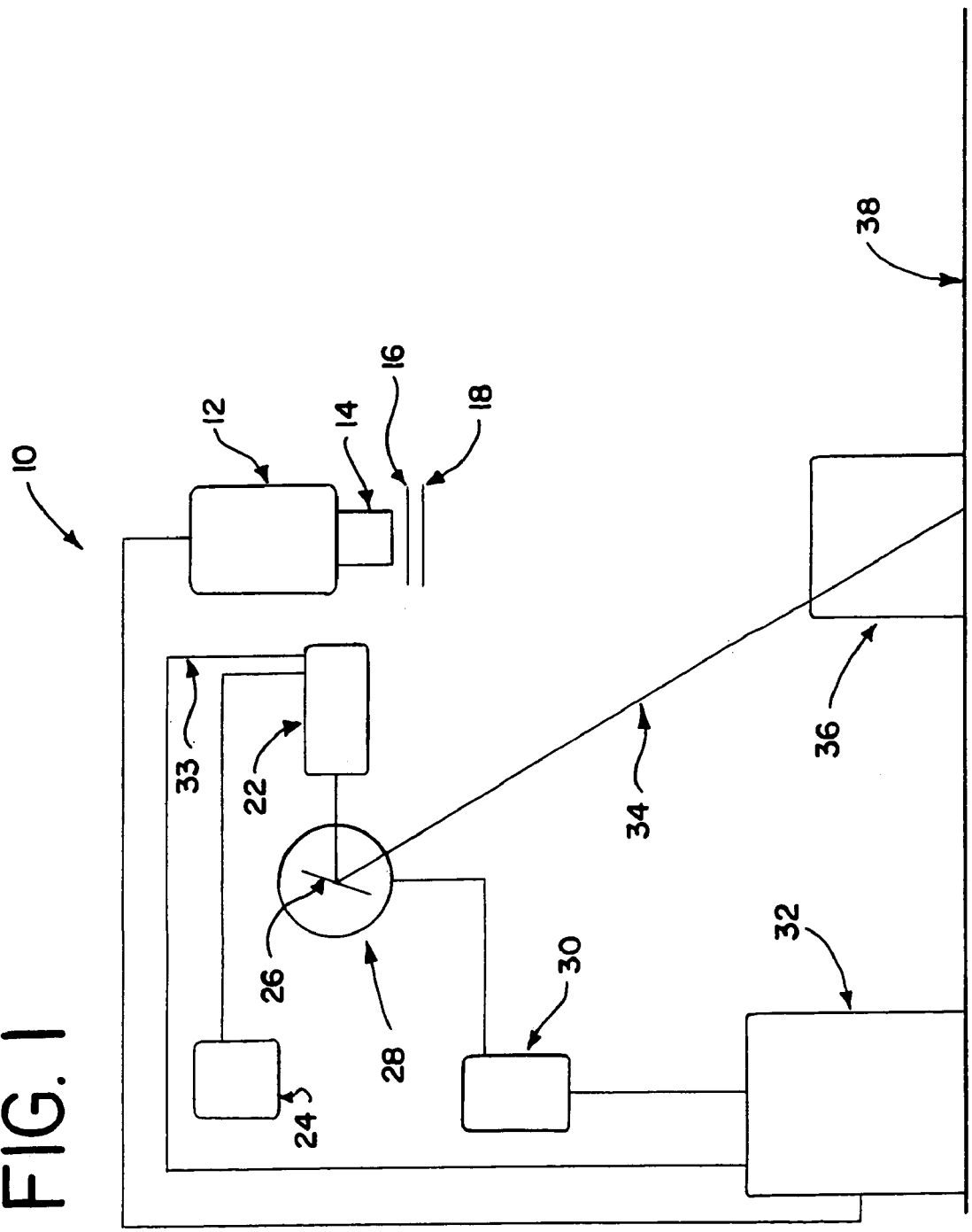
FIG. 1 is a block diagram of hardware in accordance with the invention.

While this invention is susceptible of embodiment in many different forms, there is shown in the drawings and will herein be described in detail a currently preferred embodiment of the invention with the understanding that the present disclosure is to be considered as an exemplification of the principles of the invention and is not intended to limit the broad aspect of the invention to the embodiment illustrated.

One embodiment of a dimensioning system 10 of the present invention is illustrated in FIG. 1. The system 10 includes a CCD camera 12, sensitive to long wavelength visible light (680 nm) having a lens 14 with an auto iris (iris controlled from computer and/or camera video signal). Alternatively, rather than an auto iris, a software approach could be used, wherein the camera integration time, i.e., shutter speed, is varied, which could permit faster operation. The system 10 further includes an infrared blocking filter 16 and a colored glass filter 18. The colored glass filter 18 passes deep red. The system 10 also includes a laser 22, having a 680 nm, 0.91 mW output, class II. The laser 22 produces a "flat-top" line of light with a 60° fan angle. The laser 22 is powered by a 5 V DC power supply 24. A mirror 26 is incrementally rotated by a scanner 28 under the control of a motor drive 30. Specifically, the rotational position of the mirror 26 is proportional to the voltage input to the scanner 28. A personal computer 32, incorporating input/output cards (not shown), controls rotation of the mirror 26 and operation of the laser 22, as well as performing other calculations, discussed below. The personal computer 32 controls the laser 22 via a TTL signal 33. The laser 22 forms a plane of light, generally designated 34, upon an object 36 to be measured. The object 36 can be one or more pieces. The object 36 is located on a measurement space of a surface 38, which may be a pallet, or directly upon a floor surface.

Figure 2:
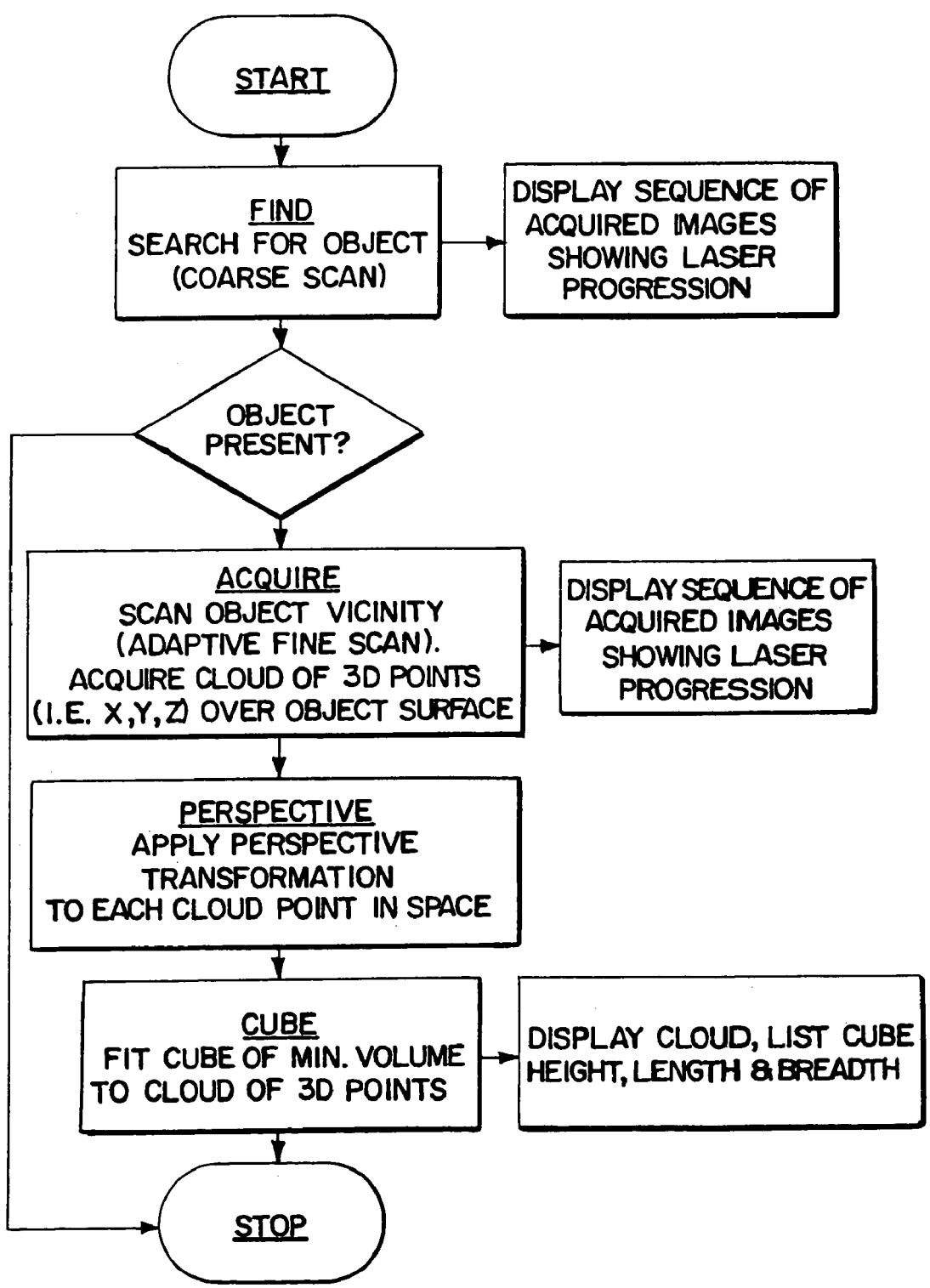
FIG. 2 is a flow chart illustrating basic steps performed by the hardware of FIG. 1.

The general steps performed by the system 10 are illustrated in FIG. 2. As discussed in greater detail below, the system 10 performs two scanning steps to dimension the object 36. The first scanning step is a coarse scan, wherein the mirror is incremented in relatively large increments, to coarsely determine the location of the start point and end point of the object 36. The second step is a fine scan, wherein the minor 26 is incremented in relatively small increments near the start point and end point of the object 36 to precisely determine the location of the periphery of the object 36.

Preferably, in a Find step, the object 36 is scanned by the laser 22 in relatively coarse steps to determine whether an object 36 is present and, if so, the general location of the beginning and ending of the object 36. If an object is not present, the system 10 stops. However, if an object 36 is present, an Acquire step is performed, wherein the object 36 is re-scanned by the laser 22, but in relatively fine steps.

An alternative scanning technique, intelligent scanning, can significantly reduce the amount of time to dimension a single object. Intelligent scanning begins with a coarse scan at a location off-center of the measurement space wherein the object rests. The coarse scan continues in a first direction, e.g., forward, until an object is found or until it is determined that there is no object near the center of the measurement space. If an object is found, the coarse scan is continued in the first direction until an edge is found. The fine scan is then initiated in a second direction opposite to the first direction, e.g., backward, over the edge. The coarse scan is then resumed at the initial starting point in the second direction until the object's other edge is found, wherein the fine scan is initiated in the first direction upon location of a second edge. If the object is not found with the first scan signal but the object edge is found with the subsequent coarse scan signal, the fine scan of the edge is immediately performed. Then, the coarse scan is resumed to find the other edge, wherein the fine scan is subsequently initiated.

A Perspective step is then performed, which adjusts the length ("x") and width ("y") dimensions in view of the height ("z") dimension. This is because small objects close to the lens appear the same as large objects distant from the lens. A Cube function is then performed which determines the dimensions of a rectangular prism having the smallest volume about the object 36.

Figure 3:
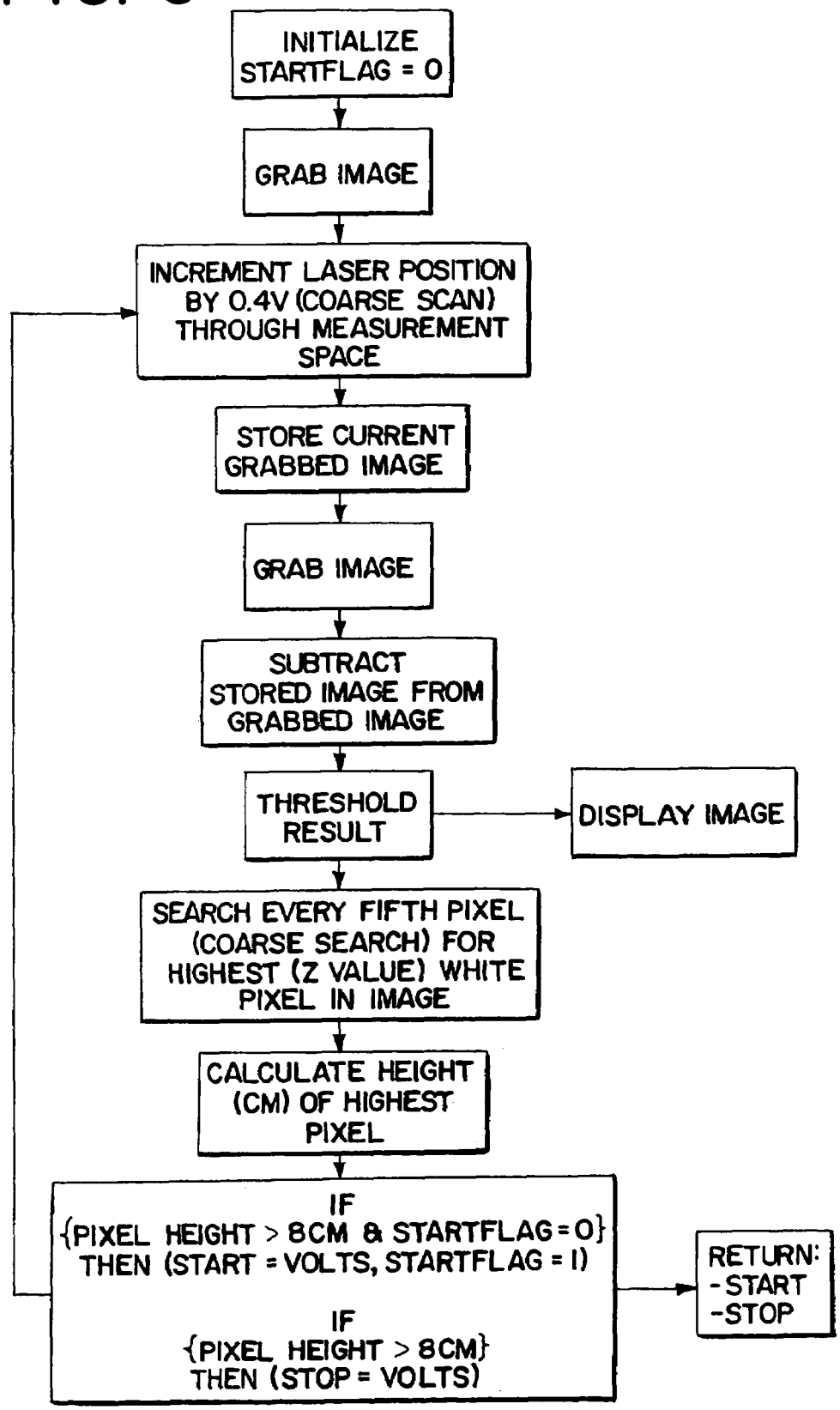
FIG. 3 is a more detailed flow chart of one of the steps of FIG. 2.

The Find step (coarse scan) is illustrated in greater detail in FIG. 3. In a first step, the system is initialized, and then a first image is obtained by the camera 12. The input voltage to the scanner 28 is increased by a coarse step, e.g., 0.4 V, which advances the mirror 26 a relatively large increment. The first image is electronically stored and a second image is obtained. In order to eliminate adverse effects of ambient light, the first image is subtracted from the second image, which eliminates the ambient light factor, leaving only the laser portion. This gray level image is then utilized as a threshold to provide a binary image.

Since the color and reflectivity of objects being measured vary, the signal may overrun into adjacent pixels, causing some measurement inaccuracies. Some of these inaccuracies may be addressed by a thresholding operation or by subsequent image filtering. Also, noise may be more prevalent in light-colored, shiny objects. For instance, for light-colored, shiny objects, the laser signal reflection is bright, and, conversely, for flat, dark-colored objects, the laser reflection signal is significantly smaller. Consequently, the optimum binary decision threshold to be used needs to be adaptive according to the reflectance/coloring of the object. It may also be necessary to adaptively alter either the camera aperture or camera integration time. Such "automatic" thresholding occurs when an object is found during a scan and the gray-scale values of the points found in the image above a threshold are gathered. A statistical property value, e.g., mean, of these points is used to choose one of a predetermined set of threshold values, preferably a set of three. The three threshold values and the scan determination values are determined during a calibration phase of the system. To further increase the coarse scan speed, every fifth pixel of the threshold result is searched to locate the highest pixel, and then the height of the highest pixel is determined. The present disclosure assumes the object has a minimum programmable height and may be located on a pallet of minimum programmable height, e.g. 8 cm high. Therefore, the object itself will always have a height greater than 8 cm. The system 10 can separate the object 36 from the pallet based upon its height. It is also possible for the system to automatically determine the height of the pallet.

The purpose of the Find function is to establish the position of the laser 22, measured in volts, both at the point at which the laser first, i.e., "start," and last, i.e., "stop," encounters the object 36. The lower box in FIG. 3 works as follows. At the start of the program, "startflag" is initialized to 0. The input voltage to the scanner 28 is incrementally increased (by 0.4 V increments) within the loop. If an object greater than 8 cm in height is encountered while "startflag" equals zero, then "start" is set to volts and "startflag" is set to one. By changing "startflag" to equal one, "start" will not be altered during subsequent passes through the loop. The second "if" statement in the final block states that if height is greater than 8 cm, then set "stop" to volts. Thus, for subsequent passes through the loop, "stop" may continually be reset, i.e., if height>8 cm. Therefore, at the end of the laser scan, "start" and "stop" are set to the points at which the laser 22 first and last encountered the object 36, respectively.

Figure 4:
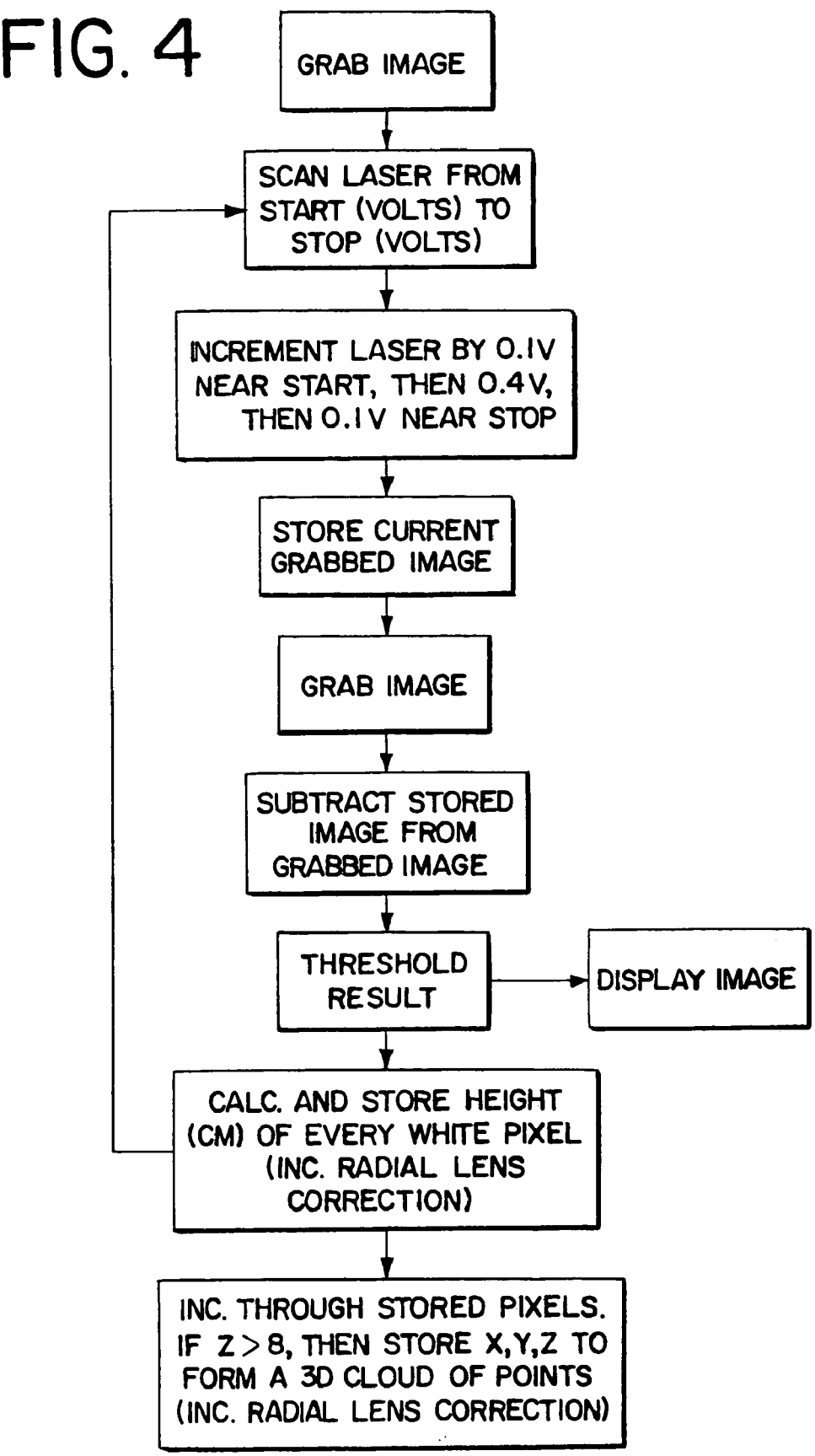
FIG. 4 is a more detailed flow chart of another one of the steps of FIG. 2.

The Acquire function is illustrated in FIG. 4. This function is similar to the Find function, except that the mirror 26 is incremented in relatively small steps at the start point and end point of the object 36. Additionally, the height of every pixel, not every fifth pixel as in the Find function, is calculated and stored. Additionally, depending upon the quality of the lens (short focal length lenses have greater peripheral distortion), peripheral correction can also be conducted. In a final step, data, e.g., a three-dimensional cloud of points, having a height greater than 8 cm, to distinguish the object 36 from the pallet, is formed.

Figure 5:
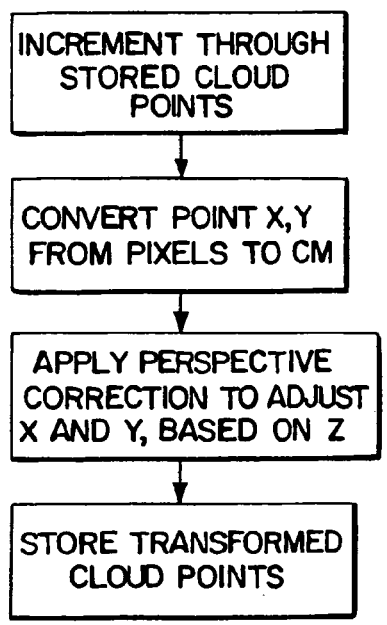
FIG. 5 is a more detailed flow chart of still another one of the steps of FIG. 2.

The next step is the Perspective function and is illustrated in FIG. 5. In this function, the personal computer increments through the stored cloud of data points and converts the "x" and "y" values from pixels to centimeters. Based upon conventional equations, these converted values are then adjusted, based upon their respective "z" value and stored.

Figure 6:
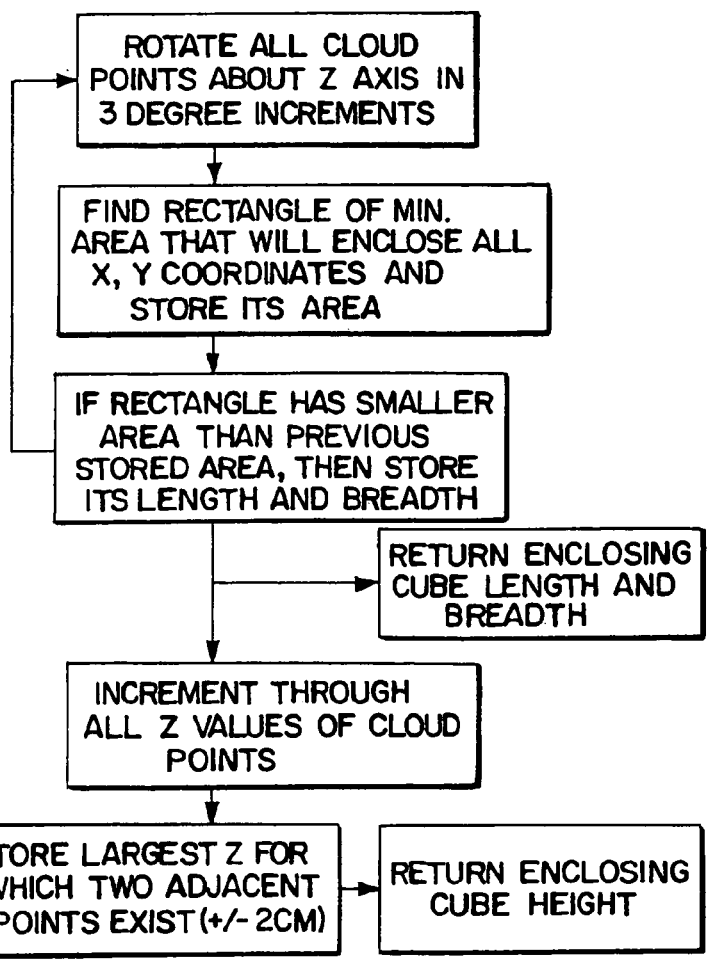
FIG. 6 is a more detailed flow chart of still another one of the steps of FIG. 2.

The next step is the Cube function, illustrated in FIG. 6, which determines the dimensions of a rectangular prism having the smallest volume about the object 36. The rectangular prism will always have a base parallel to the pallet, or other surface on which the object 36 rests. In a first step, the cloud of data points is rotated about the z-axis to determine a rectangle having the minimum area but which encloses all of the "x" and "y" coordinates. The cloud of data points continues to rotate a total of 180° to determine the smallest rectangle. This determines the length and width, e.g., breadth, of the rectangular prism. The system 10 then determines the largest "z" value, which is the height of the rectangular prism.

Utilizing the plane of light, e.g., a laser line, provides advantages in terms of being resistant to the effects of changes in background lighting, or the presence of labels and other albedo patterns on the object 36. This ability may also be enhanced by placing a filter over the camera, which is opaque to all frequencies of light other than that of the laser. The scanning line can further enable detection of more complex morphologies, which is useful for objects other than cuboids.

Figure 7:
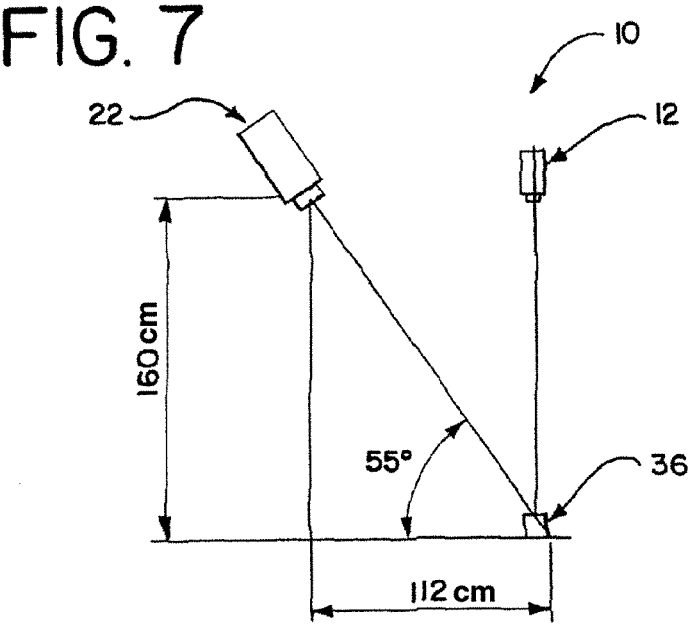
FIG. 7 is a block diagram of another embodiment of the present invention.
Figure 8:
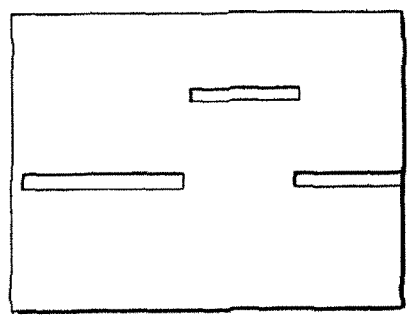
FIG. 8 is an image of a box with a line of light from a projector.
Figure 9:
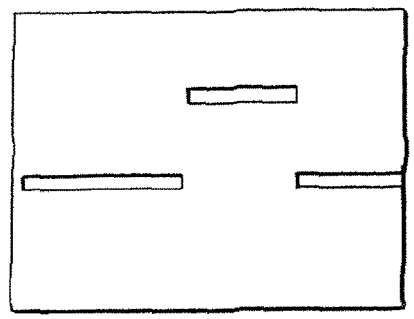
FIG. 9 is a thresholded image of the box of FIG. 8.

FIG. 7 depicts a dimensioning system 10 including a CCD camera 12 mounted above an object 36, e.g., cuboidal box, wherein a light-strip (laser) projects diagonally onto the box to produce a "pulse" type of image. The trigonometry of the system in cooperation with the image can be analyzed to determine the dimensions of the object 36. The camera 12 is mounted at a predetermined distance from the object 36 and captures the image shown in FIG. 8 by receiving a signal from the laser 22. This image was captured in the presence of a typical background, e.g., variable daylight. A filter in combination with a predetermined frequency of laser light can be utilized to effectively remove any detrimental background lighting effects. The filter is mounted on the camera and is generally opaque while transmitting the laser frequency. Such a technique can provide a significant benefit of being able to operate in typical ambient lighting. The image depicted in FIG. 8 was thresholded and is shown in FIG. 9.

Figures 13, 14:
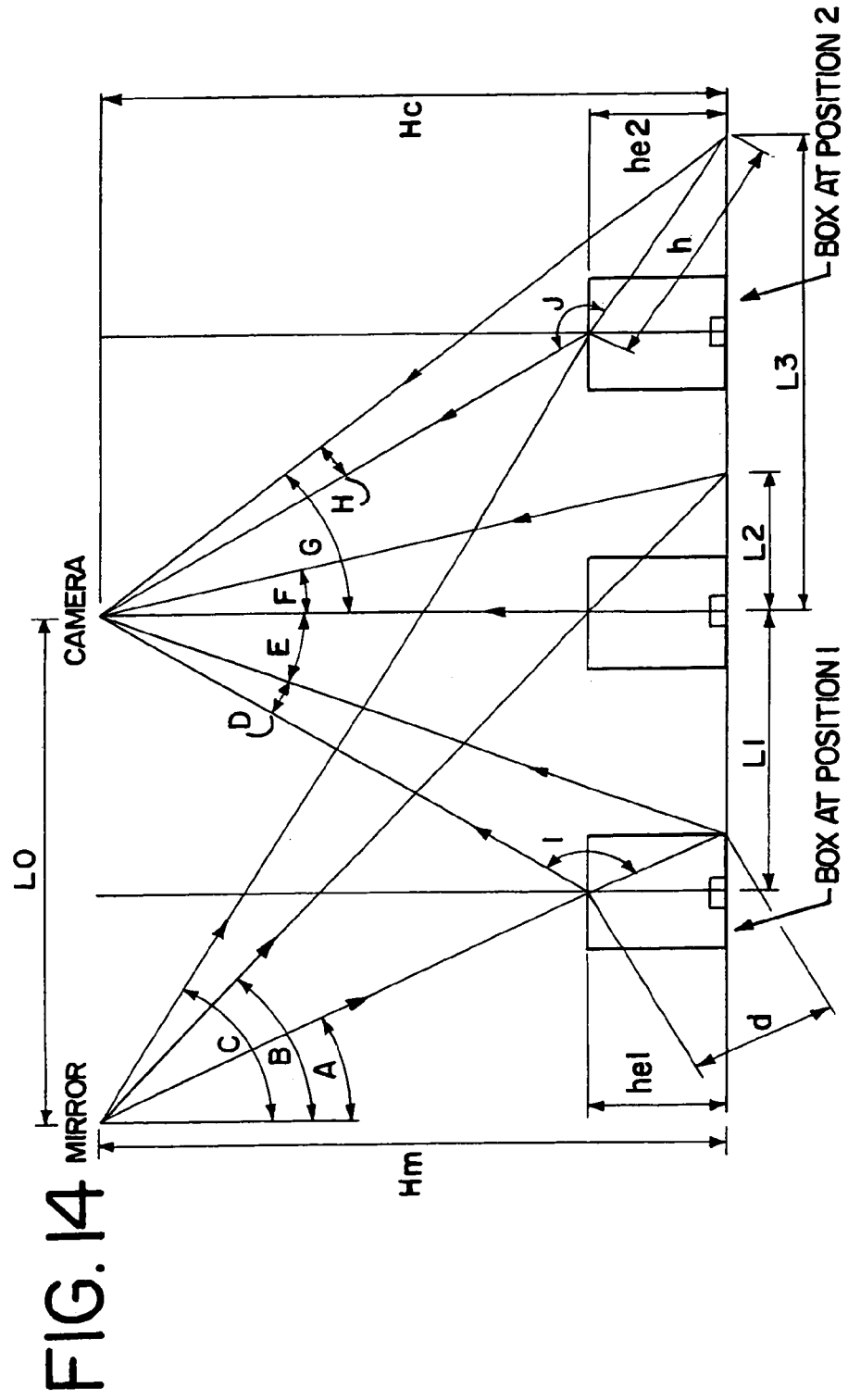
FIG. 13 is a block diagram showing the primary image processing stages of one embodiment of the present invention.
FIG. 14 is a schematic side view of one embodiment of the present invention.

Small noise elements in the measuring field can cause large errors in the dimensioning process. The noise may be attributable to small debris objects within the field of view or specular reflections of the laser on the measuring surface. To remove visible noise from the image, median filtering can be applied to the image. Median filtering is considered appropriate when the aim is to reduce noise while preserving edges. Each pixel is set to the median of the pixel values in the neighborhood of the pixel, e.g., 4×4. During image measurement applications, edges are often more useful than regions. Therefore, the image can be subjected to further filtering that will result in an increased emphasis on the edges. FIG. 9 more clearly shows the "pulse" referred to earlier. The height of the pulse can be used to determine the height of the object 36. For example, in FIG. 7, the height of the camera above the table is 160 cm, and the horizontal distance from the projector to the camera is 112 cm. The angle between the light strip and the floor, Θ, is 55°. Therefore.

$$H = d \cdot \tan(1) \qquad \text{Equation 1}$$

where d is the apparent height of the pulse shown in FIG. 14 (referred to as the line separation), and H is the height of the object 36. The line separation can be determined by using the following procedure:
- calculate the center of mass (COM or centroid) for the image;
- calculate the average y-value for the pixels above the COM;
- calculate the average y-value for the pixels below the COM; and
- subtract the first y-value from the second to obtain the line of separation.

The above procedure was employed in a MATLAB function and the line separation was found to be 146.3 cm. The length of a line on the floor was measured and compared to its length in the image in terns of pixels, and it was found that one pixel corresponds to 0.04774 cm. Consequently, the line separation was found to be 6.98 cm. Utilizing this value, H is determined to be 9.98 cm. Since the measured value for H is 10.1 cm, the calculated object height has an accuracy of 98.8%.

The present invention is capable of incorporating several additional noise detectors, filters, and methods that can be implemented to find and eliminate noise during the dimensioning process. A further noise detection method computes a spatial histogram of a point cloud data image in the horizontal and vertical directions. Spatially connected values in the histogram or, in the case of the readings along the vertical axis, values with minimal gapping, are considered to be an object. Groups of spatially detached values in any of the histograms are determined to be noise or another object. If the total number of points in the secondary object is less than a predetermined threshold, then the points associated with that secondary object are considered to be noise and are removed from the point cloud data.

Further noise reduction can be accomplished by utilizing additional vertical and horizontal histograms of an array, or image. Multiple rotations can be incorporated at varying increments, e.g., 30°, 45°, etc., wherein the array is rotated in space in the x and y planes.

Another noise detection method utilizes each column of each measurement image to identify a position of each disjoint point in the column. If more than one signal is found in each column, one of the points can be assumed to be noise. When more than one signal is found in a given column, the height values of the multiple signals are compared with the height values of other signals in the surrounding spatial area. The signal point(s) that most closely matches those in the nearby area is considered as part of the object.

Yet another noise detection method sorts the heights of the points in the object cloud. The spacing between the points is evaluated and points of similar height are grouped together. If any one group has a very small number of points, these points are eliminated from the object point cloud.

Figure 10A:
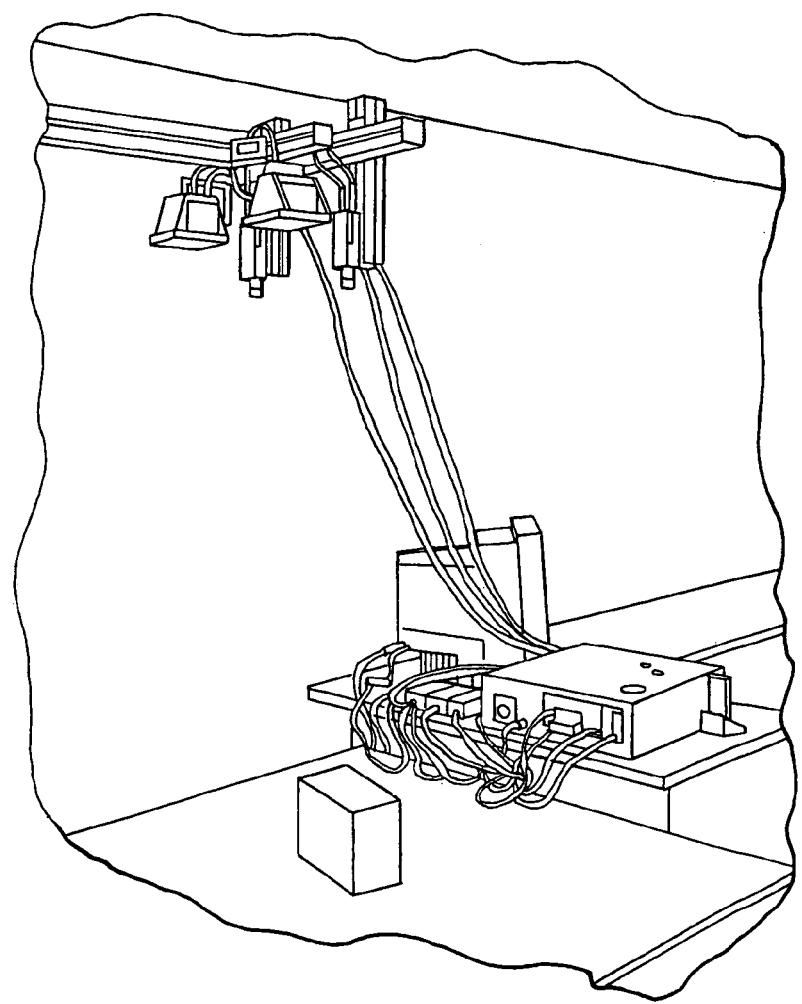
FIGS. 10a and 10b are perspective drawings showing one embodiment of the present invention.
Figure 10B:
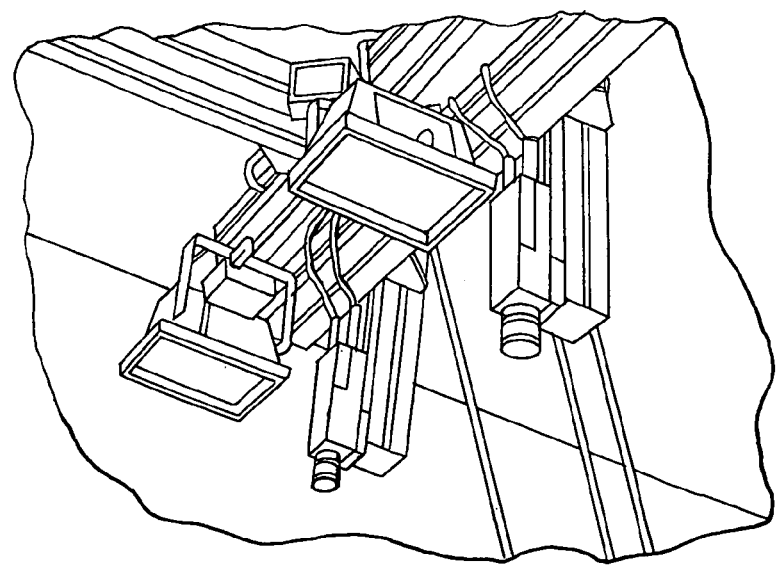

Another embodiment of the present invention for the determination of the height, length, and breadth of a cuboid utilizes the method of stereopsis. This method can be used in conjunction with other methods described in the multiple camera configuration. The system comprises two identical square pixel (11×11 mm) gray-scale cameras fitted with 8 mm (focal length) lenses. The cameras are positioned to view an object vertically from above, as shown in FIGS. 10*a* and 10*b*. The separation between the camera centers can vary in the range of 4.5 cm to 58 cm, and still larger spacing can be attained, e.g., 6 ft., with the cameras angled inward. The camera optical axes are parallel and perpendicular to a baseline connecting the two cameras, and the lens optical centers are approximately 116 cm above a level surface. The surface is preferably light-gray in color. Images of 768×576 pixels at 256 gray levels are acquired using an IMAQ 1408 framegrabber card. The object may be illuminated using two 500 W halogen lamps positioned near the cameras.

Figure 11:
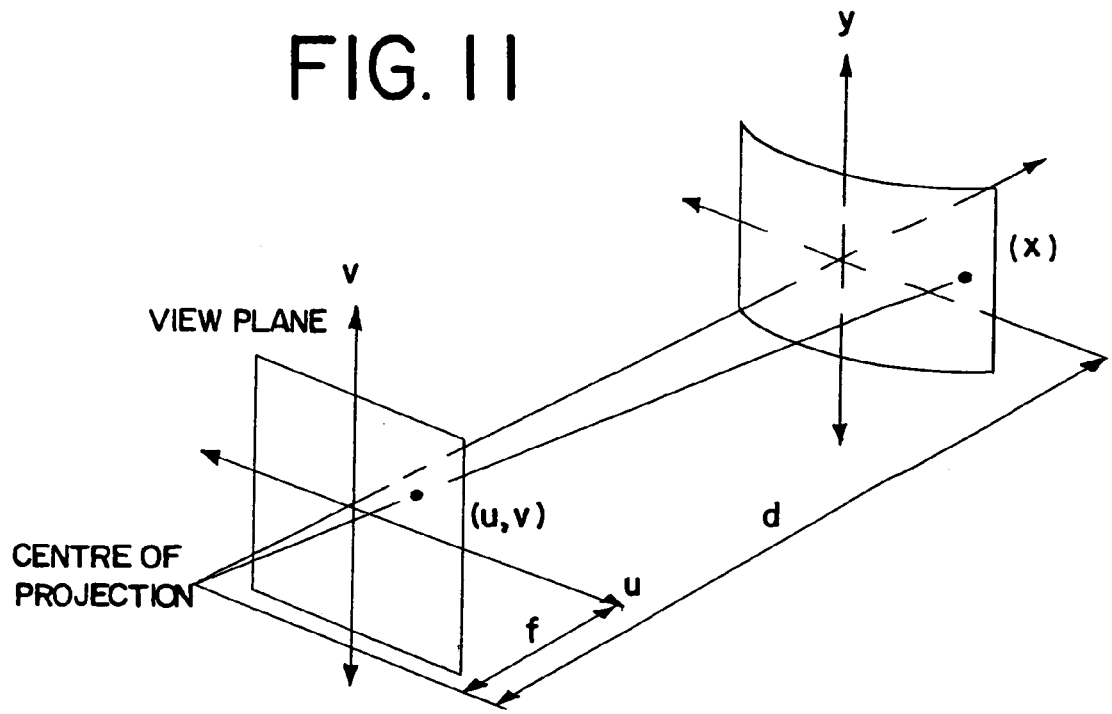
FIG. 11 shows a perspective projection in which object points are projected through the image or view plane to a point known as the center of projection or focal point.

Generally, two classes of projection are considered in planar geometric projection—perspective and parallel or orthographic projection. In the case of perspective projection, distant objects appear smaller than those nearby and are characterized by a point known as the center of projection. FIG. 11 shows a perspective projection in which object points are projected through the image or view plane to a point known as the center of projection or focal point. The location of the projected point on the image plane is given by:

$$u = (f/(z+d))x \quad v = (f/(z+d))y \qquad \text{Equation 2}$$

In parallel or orthographic projection, the lines of projected rays are assumed to be parallel, where the location of the projected point on the image plane is given by:

$$u = x \quad v = y \qquad \text{Equation 3}$$

Stereopsis, binocular stereo, and photogrammmetry all refer to a process of judging distance by observing feature differences between two or more images usually taken from different locations under similar lighting conditions. To interpret a stereo pair, it is necessary to recover a transformation between the two camera coordinate systems.

Figure 12:
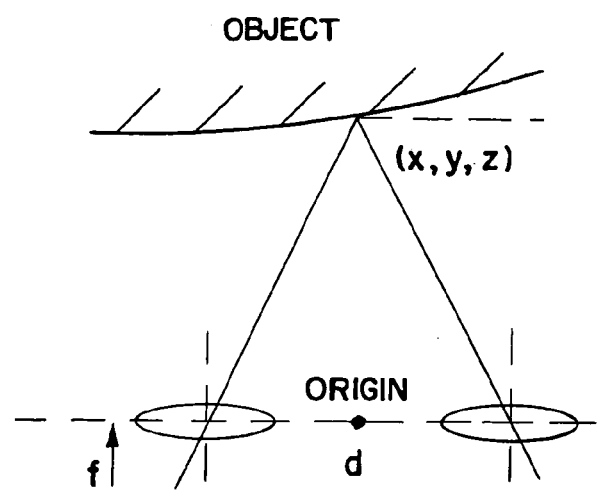
FIG. 12 shows a schematic representation of the optical geometry used in the method of stereo triangulation.

FIG. 12 shows a schematic representation of the optical geometry used in the method of stereo triangulation. The distance, or range, of an image feature from the view plane may be determined from the corresponding locations of any projected feature, e.g., the projected laser line, within the respective image planes of the two parallel cameras. Assuming the camera spacing (d) and camera focal lengths (f) to be fixed, the distance to the feature may be derived (using similar triangles) from, $$z = df/(u_L - u_r) \qquad \text{Equation 4}$$

wherein the term $(u_L - u_r)$ is referred to as the image disparity. From Equation 4, it can be readily observed that:
- the distance (z) is inversely proportional to the disparity; the distance to near objects can, therefore, be measured accurately, while the distance to far-off objects cannot;
- the disparity is directly proportional to the separation of the cameras, d; hence, given a fixed error in determining the disparity, the accuracy of z (depth) determination increases with increasing d; and
- the disparity is proportional to the lens focal length,f;this is because image magnification increases with an increase in focal length.

From the above, it is clear that the greater the camera separation (d), the greater the disparity and the better the accuracy in the determination of z. However, as the separation of the cameras increases, the two images become less similar. This is sometimes known as wide-angle stereo; i.e., there is likely to be less overlap between the two fields of view. For example, some objects imaged by one camera may not be visible to the other. This leads to a breakdown in the method. Also, it is more difficult to establish correspondence between image points in wide-angle stereo. The difficulty in applying stereo triangulation arises in reliably determining the corresponding features within the two separate images. The key to an automated stereo system is a method for determining which point in one image corresponds to a given point in another image.

Utilizing an invariant moment analysis method for determining an object's length and breadth, the ratio of the object's principal axes may be derived. If the object is assumed to be a cuboid, then the length and breadth (in addition to the location of the centroid and the orientation of the principal axis) can be determined in units of pixels. To express these dimensions in real world units, e.g., cm, it is necessary to calibrate the system, that is, to establish the size of an image pixel in world units. For an object at a fixed distance, this may readily be done by first acquiring an image of a similar object of known size. However, in the current application, the distance to the top of the cuboid object is a variable, which is dependent upon the object's height. Thus, two cuboid objects of equal length and breadth, but differing height, can appear to differ in all three dimensions. It is, therefore, necessary to introduce a calibration factor in terms of the variable z:

calibrated dimension=pixel dimension * (pixel size * range (z)/lens focal length (f))

Since the fixed position of the cameras is known, the object height may be determined using Equation 4. To achieve this, it is necessary to solve the correspondence problem, i.e., to find an object feature, or more specifically an object point, that is visible in both camera images. This pair of image points is sometimes known as a conjugate pair. Several techniques have been reported in the scientific literature for undertaking this task, including correlation methods, gray-level matching, and edge-based methods. One solution is to utilize the projected laser in each view to form the conjugate pair.

As shown in FIG. 13, the primary image processing stages are: acquisition, i.e., the capture of stereo gray-level images; preprocessing, i.e., convolution filtering to improve edge definition, etc.; blob, e.g., object, sedimentation, i.e., using a fixed or adaptive threshold; and feature extraction. i.e., determination of principal dimensions.

The feature extraction stage includes the determination of object height in world coordinates, e.g., cm; length and breadth in image coordinates, e.g., pixels; and length and breadth in calibrated world coordinates, e.g., cm.

To further understand the present invention, the results and analysis of a method utilizing scanning laser light and vision system techniques for determining the height of a cuboidal object is presented. It is to be understood that the present invention is not to be limited to these results and analysis. A geometrical analysis was performed to allow for parallax and perspective effects. The technique produced accurate height values. For boxes placed directly under the camera, errors in the measurements were less than the variation in height across the width of the box. For example, an 18 cm-height box was moved by 50 cm in the x and y directions, and the corresponding height value was 17.9 cm. Therefore, for this analysis, maximum errors in height determination were less than +/−1%.

The system comprised a laser apparatus having a Class II laser diode (635 nm) with a cylindrical lens producing a plane of light with a full divergence angle of 60° and a precision scanner with a mounted mirror utilizing drive electronics tuned to the mirror. The orientation and location of the scanner and mirror can be adjusted as required for the application. Also included in the system were instrumentation and control apparatus including an input/output card, framegrabber card, cabling, and connections. The software included LabVIEW 6I with NI-DAQ software (used for controlling the mirror) and IMAQ software (for image acquisition and analysis). Additional equipment comprised: 512×512 gray-scale camera (pixels 11 micron×11 micron), HP Vectra PC, and cuboidal boxes of various dimensions. The measurement surface on which the boxes were placed was painted matte black.

Figure 15:
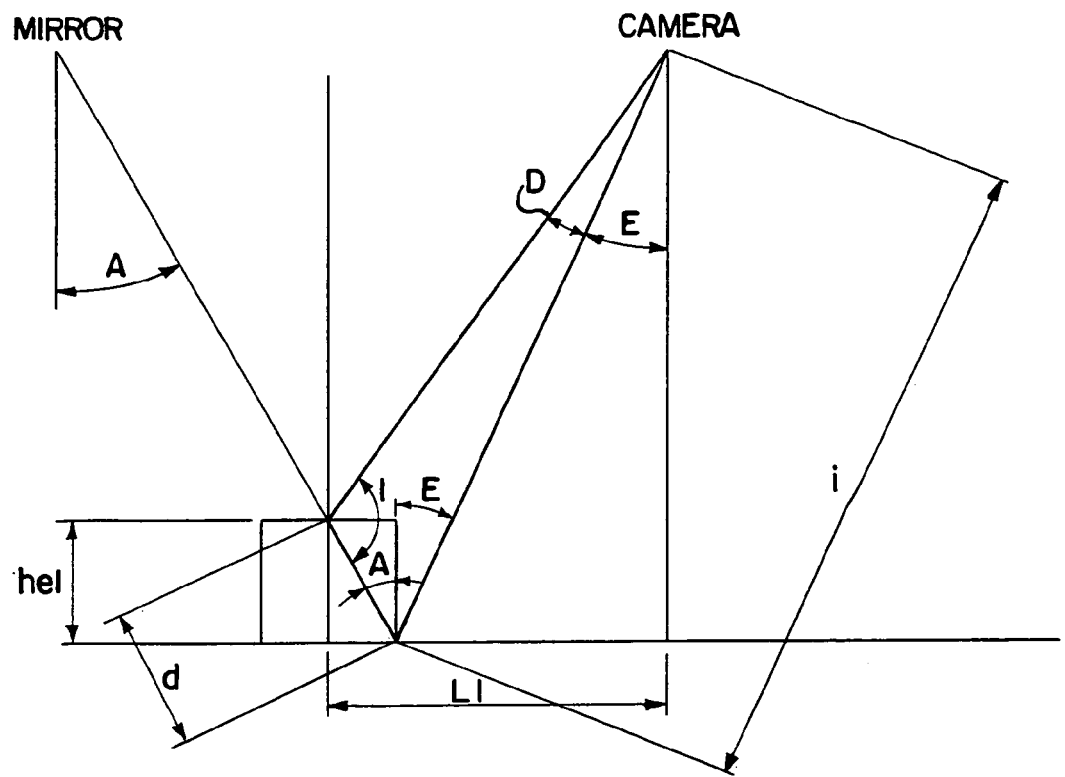
FIG. 15 is a schematic drawing showing geometric detail of the triangle formed by one embodiment of the present invention.

The configuration of the system is shown in FIG. 14 wherein Hm=190 cm, Hc=139 cm, and Lo=116 cm. Three possible locations for an object are shown in FIG. 14. A geometrical analysis was performed for the two general cases shown, i.e., placement of the object 36 at position 1 and at position 2. FIG. 14 is a schematic side view of the experimental arrangement of the mirror, camera, and box (shown at three possible locations). Many of the angles and dimensions that need to be found for the determination of box height are shown in FIG. 14. FIG. 15 shows detail of the triangle formed by the camera and the point at which the laser light impinges on the box and on the surface. For this triangle, the Sine Rule states, $$d/\sin(D) = i/\sin(I)$$

$$d = i \cdot \sin(D)/\sin(I)$$

Since the sum of the internal angles for a triangle is 180°, $$I = 180 - D - (A+E)$$

Also, from the Theorem of Pythagoras, $$i = ((L1)^2 + (Hc)^2)^{0.5} \; d = ((L1)^2 + (Hc)^2)^{0.5} \sin(D)/\sin(180 - D - (A+E))$$

It can also be seen from FIG. 15 that, $$\cos(A) = he1/d$$

$$he1 = d \cdot \cos(A)$$

Therefore, $$he1 = ((L1)^2 + (Hc)^2)^{0.5} \sin(D) \cdot \cos(A)/\sin(180 - D - A - E) \quad \text{Equation 5}$$

Equation 5 can be used when the horizontal distance from the mirror to the box is less than Lo. Similarly, for a box positioned at position 2, $$he2 = ((L3)^2 + (Hc)^2)^{0.5} \sin(H) \cos(C)/\sin(180 - H - C + G)) \quad \text{Eqation 6}$$

Equation 6 can be used when the horizontal distance from the mirror to the box is greater than Lo.

Equations 5 and 6 can, therefore, be used to determine the height of a box, assuming that the laser light can be seen as it impinges on the top of the box and on the surface. This would be seen at the camera as two lines of light.

Further, due to the uncertainty as to the color and texture of the surface that is utilized in the warehouse environment, it is desirable that the height of the box could be determined without the need to detect the laser light as it impinges on the adjacent floor surface of the measurement space. Black rubber matting has a tendency to reflect a minimal proportion of the incident light so that good imaging of the line may not be possible. It is further desirable that the height of the object be determined purely from analysis of the line of laser light visible on the top of the object. This can be achieved due to the high level of accuracy and repeatability attainable from the scanner that is used for positioning the mirror. The rotational position of the mirror is proportional to the voltage supplied to the scanner's drive electronics. Lab- VIEW software is utilized to supply a number of voltages and the corresponding position of the laser line on the table can be measured. Trigonometry is used to relate this to the angle of the mirror, A. Solving the resulting simultaneous equations allows for the angle of the mirror to be calibrated in terms of applied voltage using, for example, the following equation:

$$A=1.964(V)+17.94 \qquad \text{Equation 7}$$

where V is the applied volts.

For a given voltage applied to the scanner, it is possible to predict the position of the laser line on the floor surface. This position is quantified in terms of the y-pixel coordinates of the centroid of the line, as viewed at the camera. The camera was arranged such that y-coordinate values increased as the line moved to the left side, as shown in FIG. 14. This pixel value does not vary linearly with the angle of the mirror, A; however, it may be expected to be proportional to tan(A). Therefore, the mirror can be positioned to various angles, noting the corresponding pixel values. Solving the simultaneous equations yields the following:

$$\text{pixel } y\text{-value}=-1020.43(\tan(A))+883.32 \qquad \text{Equation 8}$$

Most of the values in Equation 5 needed to calculate the height are available wherein L1 can be found from the geometry shown in FIG. 14; the equation is:

$$L1=Lo-Hm(\tan(A))$$

Figure 16:
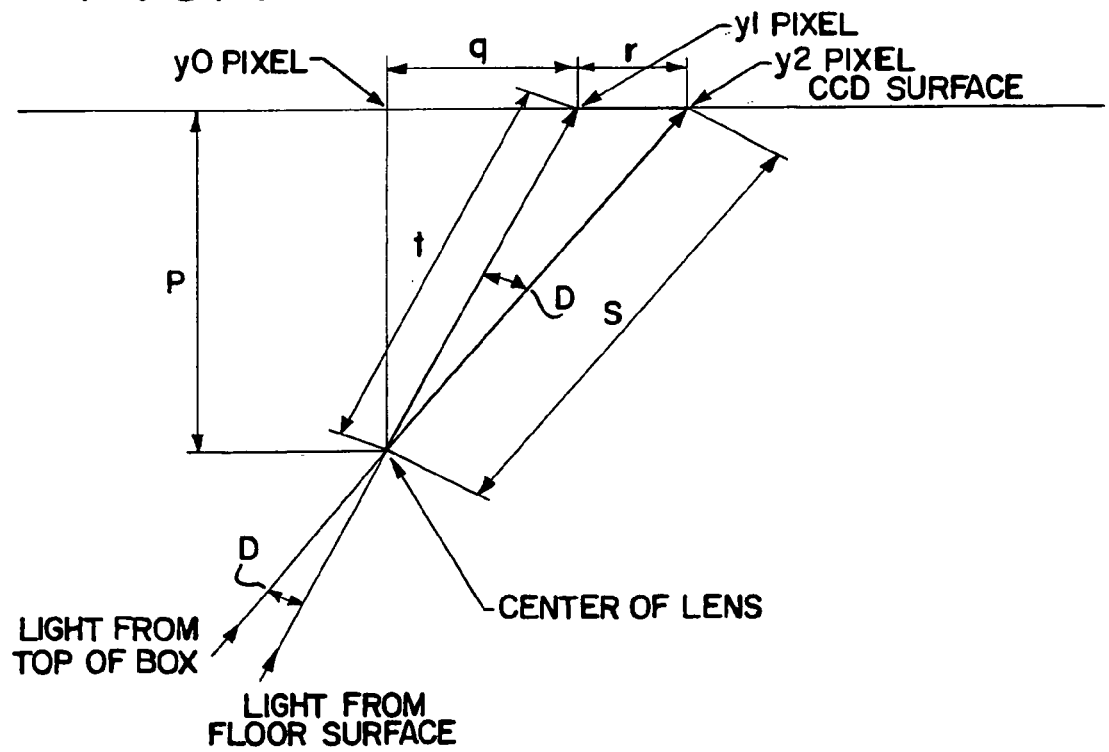
FIG. 16 is a schematic drawing of light from the box passing through the camera lens and impinging on the CCD camera detection surface.

The determination of the angle D, which is the angle subtended at the camera lens by the pixel y-value of the laser line that impinges on the floor surface (determined using Equations 7 and 8 for a given voltage. V, and the pixel y-value of the laser line that impinges on the top of the box (found from analysis of the image)) can be through analysis of the paths of light that pass through the camera lens and impinge upon the charge coupled array. This is shown in FIG. 16 for detection of the height of the box at position 1. From FIG. 16.

$$q=y1-y0$$

where y1 is the predicted y pixel value for the laser light which impinged on the floor surface, and y0 is the y value of the central pixel. i.e., 256.

Also, $$q+r=y2-y0$$

where y2 is the y-pixel value for the line on the top of the box. As explained above, y0, y1, and y2 can be found, and, therefore, q and r can be determined, p is the focal length of the lens, e.g., p=8 mm. Therefore, t can be found from the Theorem of Pythagoras. The Cosine Rule states, $$\cos(D)=(t^2+s^2-r^2)/2ts \qquad \text{Equation 9}$$

The above formula provides for determining the angle D. This can then be combined with the other derived parameters and substituted into Equation 5 to give the height of the box, he1.

In one example, Hc, the height of the camera above the table, is 139 cm. Hm is the height of the scanner mirror above the table and is 190 cm. Lo is 116 cm and is the orthogonal distance from the scanner mirror to the table. A voltage of 4.9 V applied to the scanner driver provides the mirror an angle A of 27.56°. E was determined to be 6.9° and L1 to be 16.83 cm. A box was placed on the surface and the measured value for y2 (the y pixel of the centroid of the line on top of the box) was found to be 389.8. The value for y1 (the predicted y value for the centroid of the line on the floor) was 350.71. The value for y0, the center pixel in the camera's field of view, is 256.

$$q = y1 - y0$$
$$= 350.71 - 256$$
$$= 94.7 \text{ pixels}$$

thus, $q = 1.04$ mm (1 pixel has a side length of 11 microns)

$$q + r = y2 - y0$$
$$= 389.8 - 256$$
$$= 133.8 \text{ pixels}$$
$$= 1.4718 \text{ mm}$$

Therefore, r=0.43 mm. p, q, and r can be used to find t and s:

$$t=(p^2+q^2)^{0.5} \text{ (}p\text{ is the focal length of the lens, e.g., 8 mm.)}$$

thus, $t=8.067$ mm $$s=(p^2+(q+r)^2)^{0.5}$$

thus, $s=8.134$ mm

Entering these values into Equation 9 yields a value for angle D of 3.005°. By substituting this value into Equation 5, along with the other values given above, the value of he1 was determined to be 10.67 cm. The measured height of the box was found to be 10.6 cm.

An accuracy check of the laser line method for height measurements of a box at a significantly different point in the field of view reveals that a change in the position of the box in the camera's field of view has any significant effect on the accuracy with which the height can be determined using the scanning laser line technique. Again, using the 8 mm lens, a box was placed at a displacement of 40 cm in both x and y directions from the camera. The line of light impinged on the top of the box when a voltage of 3.9 V was applied to the scanner driver. Calculations showed that A=25.6°, L1=24.97 cm, D=5.3797°, and E=10.18°. From these values, he1 was determined to be 17.9 cm. This compares with a height value from direct measurement with a rule of 18 cm, giving an error of 0.55%.

The line scanning technique described here offers a number of advantages in addition to high accuracy height measurement. For example, image analysis is simplified since, at any given time, the image captured is simply that of the line section which is impinging on the top of the box, and the orientation of this line relative to the camera does not change. A combination of such images (for different mirror angles) can be used to determine the length, width, and location of the box, as described earlier. Due to the large amount of information provided during the scan, the technique also offers potential for quantification of the morphology of more complexly shaped objects.

Various techniques can be implemented to reduce the scanning time and amount of memory typically required in dimensioning systems. Some of these techniques include a quick scan of each image to determine if any object, i.e., line segment, is present. If not, then that image would be immediately discarded. Also, coarse scanning of a plane of light could be utilized for position detection, followed by finer scanning for determination of the four sides of the object. The measurement density required will depend upon the resolution required from the system. For example, if the smallest object that the system needs to detect is a cube of a side length 30 cm, then it would not be necessary to scan the line across the floor in intervals of less than approximately 25 cm. If further reductions in time are required, conventional image processing could be combined with line scanning. The direct image processing might quickly give the centroid of the plan view of the box (along with its length and width). The laser line would be directed to the image centroid and then scanned until an image of the line on top of the box was attained. Processing of this one image would then give the box height. Such a system may Generally be expected to allow determination of the box parameters in a very short time, e.g., less than one second.

Perhaps one of the more formidable difficulties to be overcome in vision system box measurement is associated with thresholding and field of view. By means of adjusting the camera aperture or integration time, and application of a suitable threshold, it is possible to obtain images consisting of only the laser line as it passed over the top of the object. However, when the intensity of the background light increases other features become visible, such as reflections of daylight from the floor and from plastic tape present on the boxes. These effects can be avoided by utilizing an infrared laser with a filter placed on the camera lens so that only the laser light would be visible to the CCD array.

Figure 17:
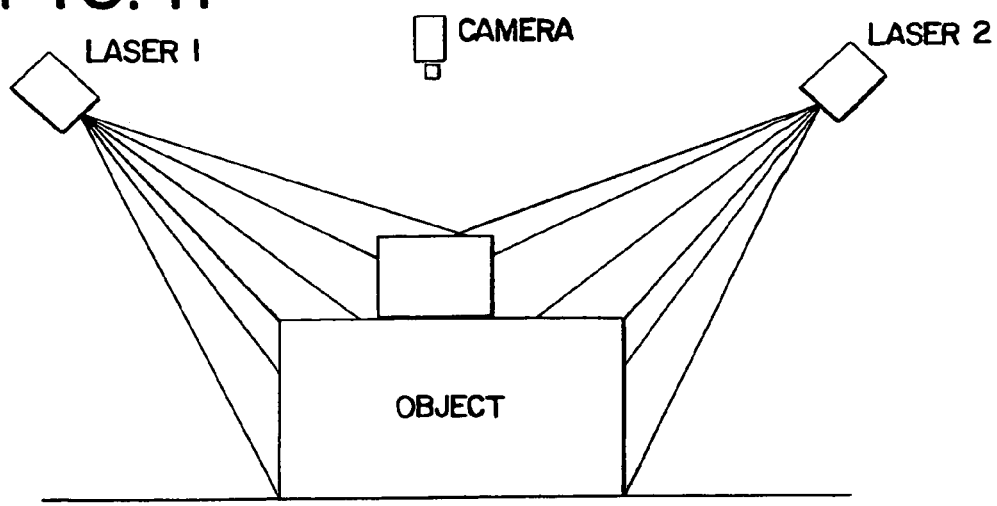
FIG. 17 is a block diagram of another embodiment of the present invention.

The active nature of the structured lighting approach has significant advantages over more passive lighting techniques, particularly given possible complexity in object shape and the already relatively unstructured nature of the environment, i.e., difficulty in controlling ambient lighting and variation in object position and size. Shadowing problems may be alleviated by moving the laser closer to the camera (with some reduction in accuracy) or simultaneously scanning from opposing directions. FIG. 17 depicts this configuration, although deep recesses will remain difficult to recover.

Figure 18:
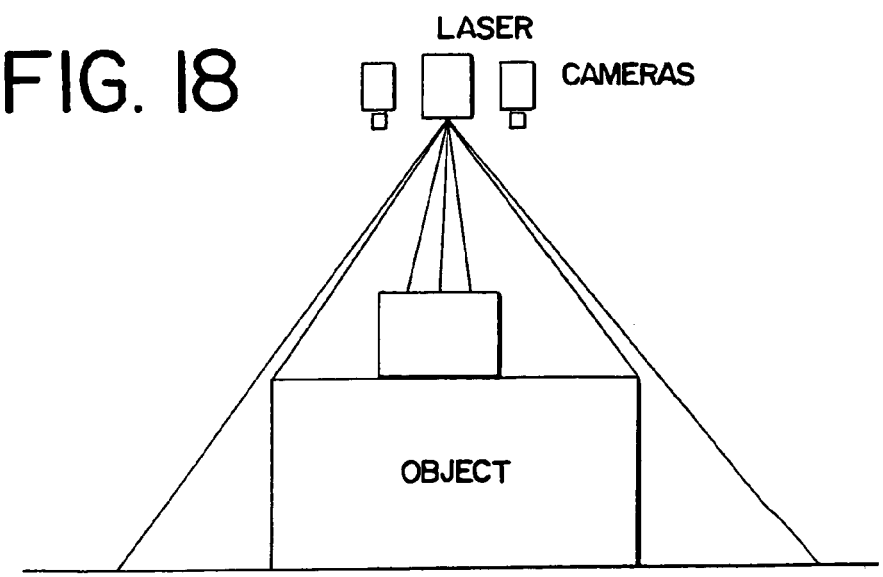
FIG. 18 is a block diagram of another embodiment of the present invention.
Figure 19:
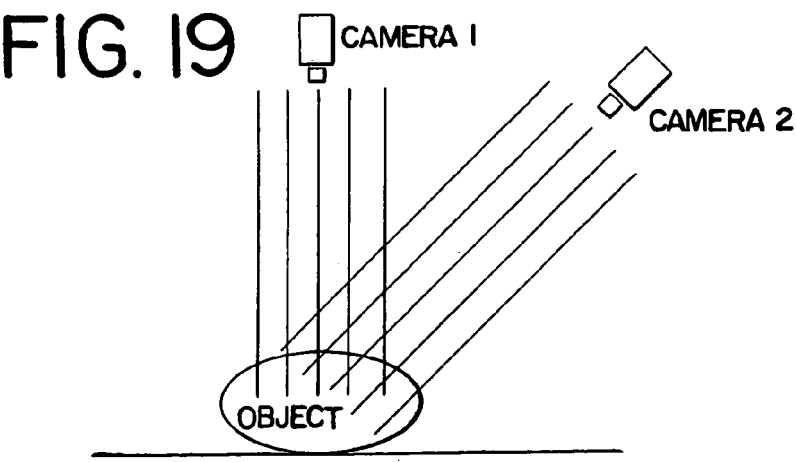
FIG. 19 is a block diagram of another embodiment of the present invention.

Alternatively, as shown in FIG. 18, stereo triangulation in cooperation with a scanning laser mounted near the camera(s) can be utilized to determine range. This configuration reduces the problem of shadows while again taking advantage of structured lighting to simplify the image analysis. It might be possible to determine object position, length, and width by initially using a single uniformly illuminated image together with a method of moments, and then actively directing the laser to locally scan across the object to recover the height profile using the triangulation method. Such a system is a hybrid of both passive (relatively unstructured) and active (structured) illumination, attainable perhaps by utilizing a dual-image threshold.

Figure 27:
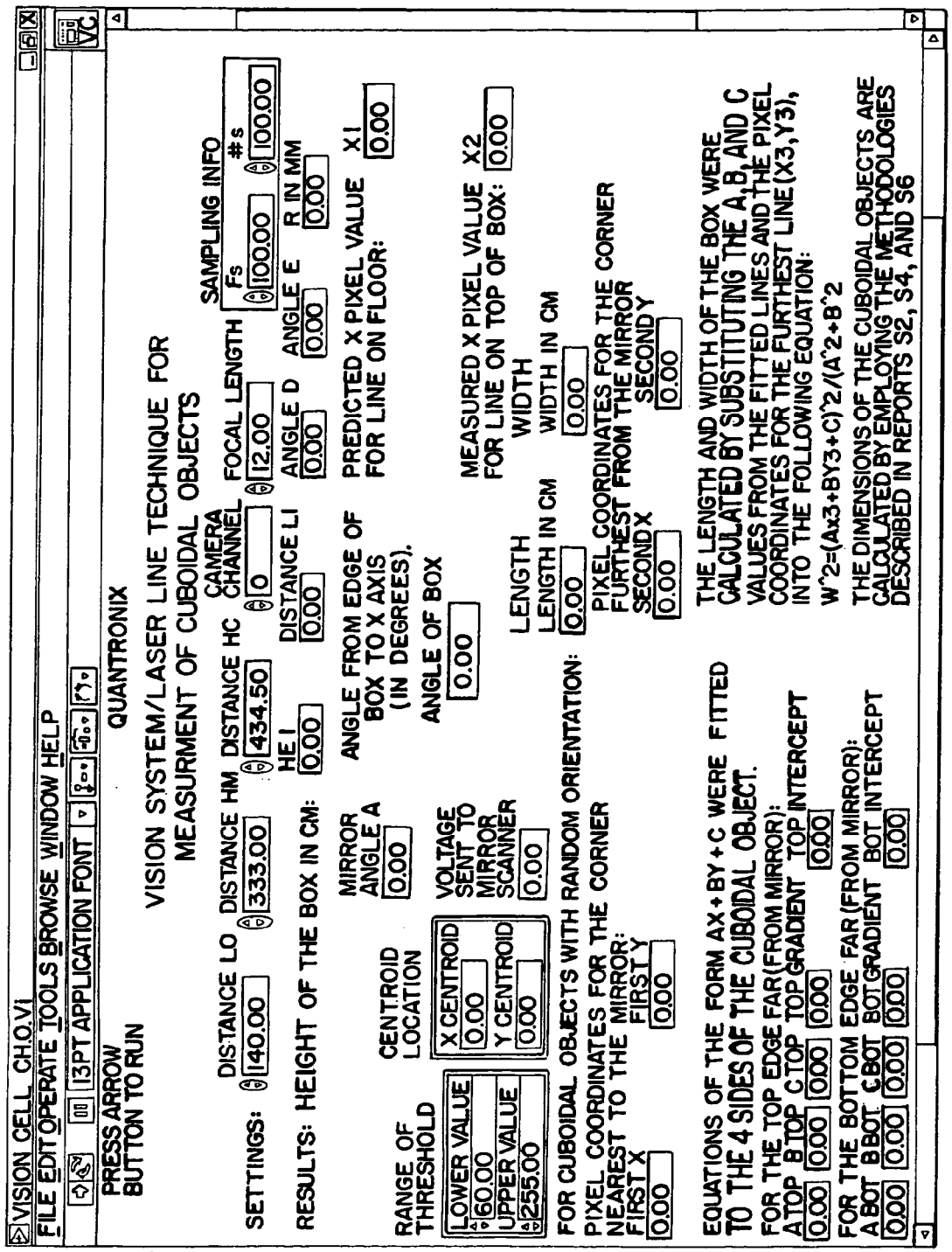
FIG. 27 depicts a screen of a graphical interface of the dimensioning system of the present invention.

Alternatively, when capable of segmenting the object by thresholding, determining the height of a more complex object is simplified by utilizing a second camera viewing the object horizontally. One such configuration of a two-camera system is shown in FIG. 27. The second camera is mounted at approximately 60° from the horizontal. This type of configuration may require a type of tomographic approach, or a form of stereo, to find the dimensions of the object.

Another aspect of the present invention involves a simple method for correcting the location of image points when subject to radial lens distortion. The approach requires only two calibration images to establish the necessary distortion coefficients.

Given the desire to achieve a relatively compact overall working volume of the dimensioning system 10, it may be preferable to view large objects at relatively close proximity. A wide angle of view may be achieved by using a lens of short focal length, e.g., less than 12 mm; however, this is at the cost of some image distortion, sometimes known as "barrel distortion." Radial lens distortion can be approximated mathematically; however, as related by Schluns and Koschan, it becomes difficult to reliably model the distortion given inevitable variations in lens quality. An ideal model of lens distortion leads to an infinite number of distortion coefficients.

Figure 20:
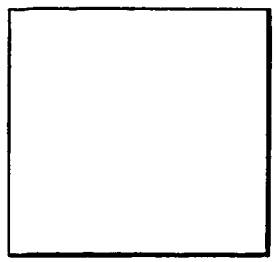
FIG. 20 depicts an undistorted image of a square.
Figure 21:
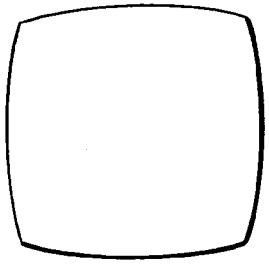
FIG. 21 depicts a simulated image affected by radial lens distortion.
Figure 22:
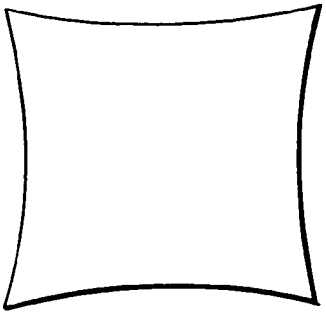
FIG. 22 depicts a simulated image affected by radial lens distortion.

FIG. 20 depicts an undistorted image of a square and FIG. 21 depicts an image subject to considerable radial lens distortion in which the corners of the distorted image are observed to be projected towards the center of the image. Notice also that the distortion can be reversed, in which case the corners of the image are now projected away from the image center, as shown in FIG. 22.

Figure 23:
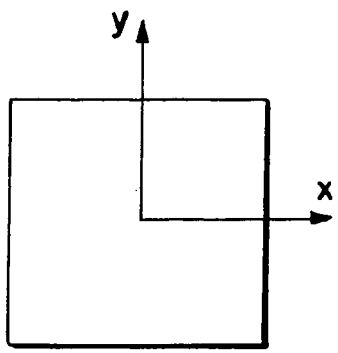
FIG. 23 depicts an image on a coordinate frame.

A reasonable approximation of the lens distortion may be obtained by considering only two coefficients, $C_1$ and $C_2$. Consider a coordinate frame located at the center of the image shown in FIG. 23. Let $x_d$ and $y_d$ be the distorted image coordinates, and $x_u$ and $y_u$ be the undistorted image coordinates, for which:

$$x_u = x_d(1 + C_1(x_d^2 + y_d^2) + C_2(x_d^2 + y_d^2)^2) \text{ and } y_u = y_d(1 + C_1(x_d^2 + y_d^2) + C_2(x_d^2 y_d^2)^2)$$

The distortion coefficients, $C_1$ and $C_2$, can be determined by suitable calibration. If $C_1$ or $C_2$ are positive, then the image is projected in towards the center, and, conversely, if negative, the image is projected out away from the image center.

Figure 24:
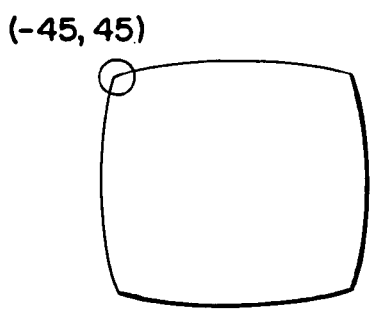
FIG. 24 is a distorted image of a square.
Figure 25:
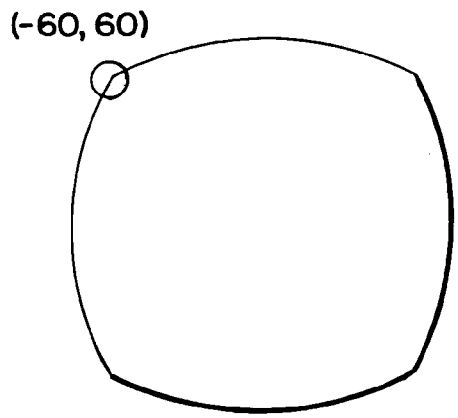
FIG. 25 is a distorted image of a square.

To calculate $C_1$ and $C_2$, distorted images of two objects of differing size are utilized. The objects are positioned at the center of the field of view. Given that the image distortion tends to increase towards the edge of the image, one of the objects is chosen to be quite large in relation to the field of view. The distorted images of a square of 100 pixels and 150 pixels are shown in FIGS. 24 and 25, respectively. Preferably, the objects are square-shaped so that the corner features might readily be identified. The coordinate location of the top left corner of each square is measured, relative to the center of each image, and found to be (−45, 45) and (−60, 60), respectively, where the corresponding undistorted coordinates are (−50, 50) and (−75, 75), respectively. (Image size 200×200 pixels with coordinate frame located at image center.) Thus, $$-50 = -45(1 + 4050 C_1 + 16.4 \times 10^6 C_2)$$

and $$-75 = -60(1 + 7200 C_1 + 51.84 \times 10^6 C_2)$$

Solving these simultaneous equations yields $C_1 = 1.8 \times 10^{-5}$ and $C_2 = 2.3 \times 10^{-9}$. Further, $$x_u = x_d(1 + 1.8 \times 10^{-5}(x_d^2 + y_d^2) + 2.3 \times 10^{-9}(x_d^2)^2)$$

and $$y_u = y_d(1 + 1.8 \times 10^{31\ 5}(x_d^2 + y_d^2) + 2.3 \times 10^{-9}(x_d^2 + y_d^2)^2)$$

Figure 26:
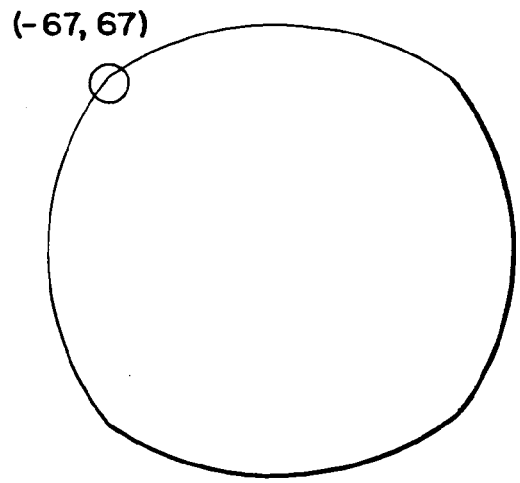
FIG. 26 is a distorted image of a square.

For a distorted image of a square of 180 pixels shown in FIG. 26, the measured x-coordinate of the upper left corner was found to be −67 pixels. (image size 200×200 pixels, with coordinate frame located at image center.) This gave a calculated undistorted location of −90.25 pixels, which compares favorably with the actual undistorted location of −90 pixels.

This relatively simple approach provides a useful mechanism for the correction of the location of image points when subject to significant radial lens distortion. The distortion coefficients can be determined during calibration of the dimensioning system and stored in a lookup table for access during the dimensioning process. Alternatively, using aspherical lenses may also reduce the effects of "barrel" distortion.

Another alternative to correcting for the lens distortion is to create equations or lookup tables to compensate for the distortion. The laser signal is scanned over the entire measuring region in very fine increments. At each position of the laser, through mathematical modeling using the known angle of the laser, relative camera and laser positions, and ideal lens properties, the theoretical placement of the signal on the sensor array can be determined. Images are gathered at each laser position by the camera. A comparison is made between the theoretical value the pixel should have and the actual value detected during the measurement. From the resulting data, a lookup table can be generated that indicates pixel correction values for each pixel.

An alternative method of removing distortions requires scanning the measurement in relatively small, predetermined increments. The x-coordinate field is segmented into multiple segments, e.g., 10. A mean y-coordinate value is determined for each segment and each scan. Creating sets of (x, y) data where the x value represents the voltage increment of the laser and the y-value represents the spatial y-position of the laser in the image, polynomial line-fitting routines are used to create equations that describe a baseline voltage-laser relationship for the image. This baseline measurement effectively provides information that, when compared with expected values, is used to remove distortions.

Figure 28:
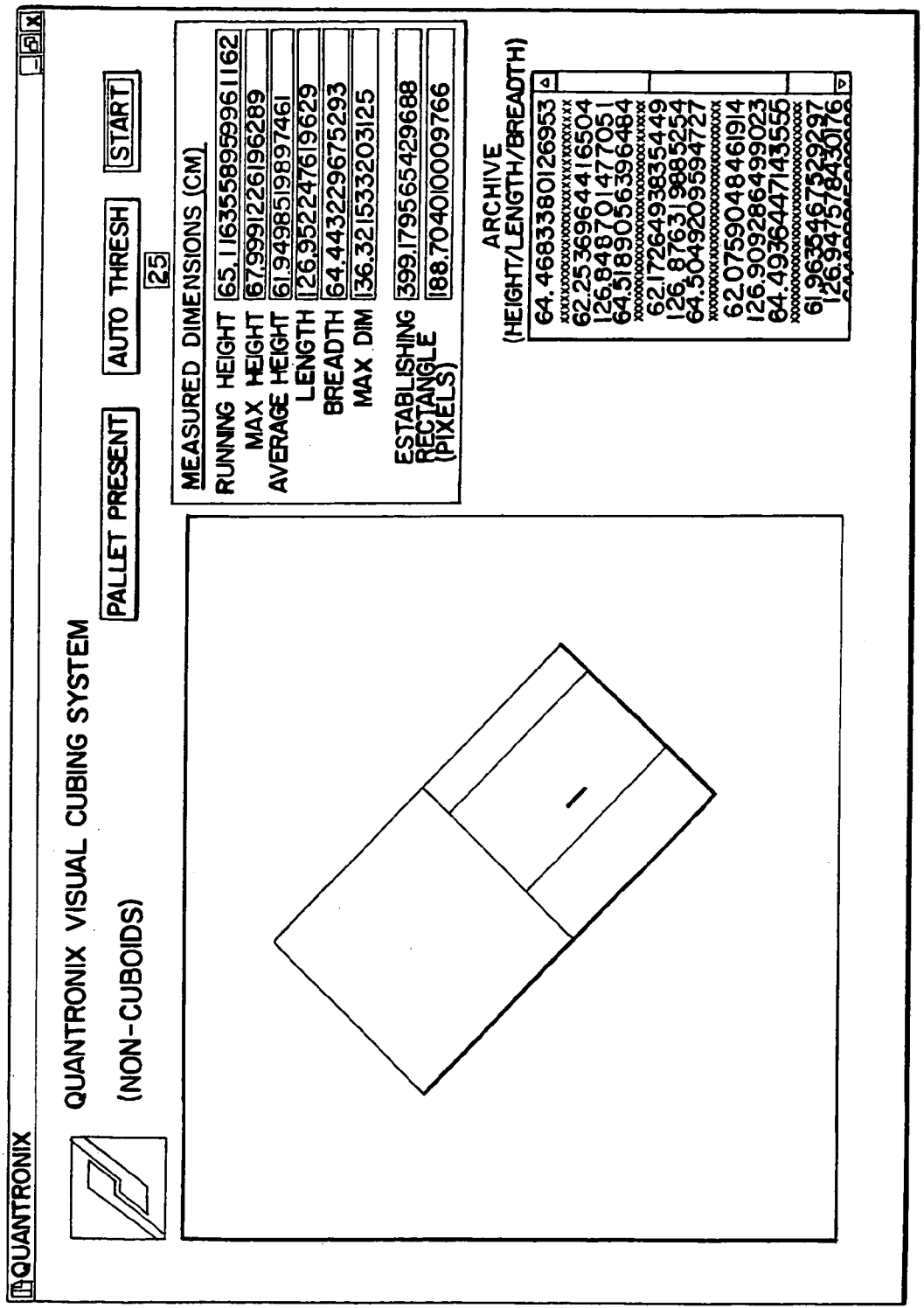
FIG. 28 depicts a screen of a graphical interface of the dimensioning system of the present invention.

A graphical interface for a cuboidal and noncuboidal object dimensioning system is depicted in FIGS. 27 and 28, respectively. The cuboidal system also incorporates a second screen (not shown) that displays the scanning laser line as it traverses across the object. The graphical window for the noncuboidal system also displays the scanning laser line, as well as an image representing the entire scanned object surface, with a superimposed minimum enclosing box.

Figure 29:
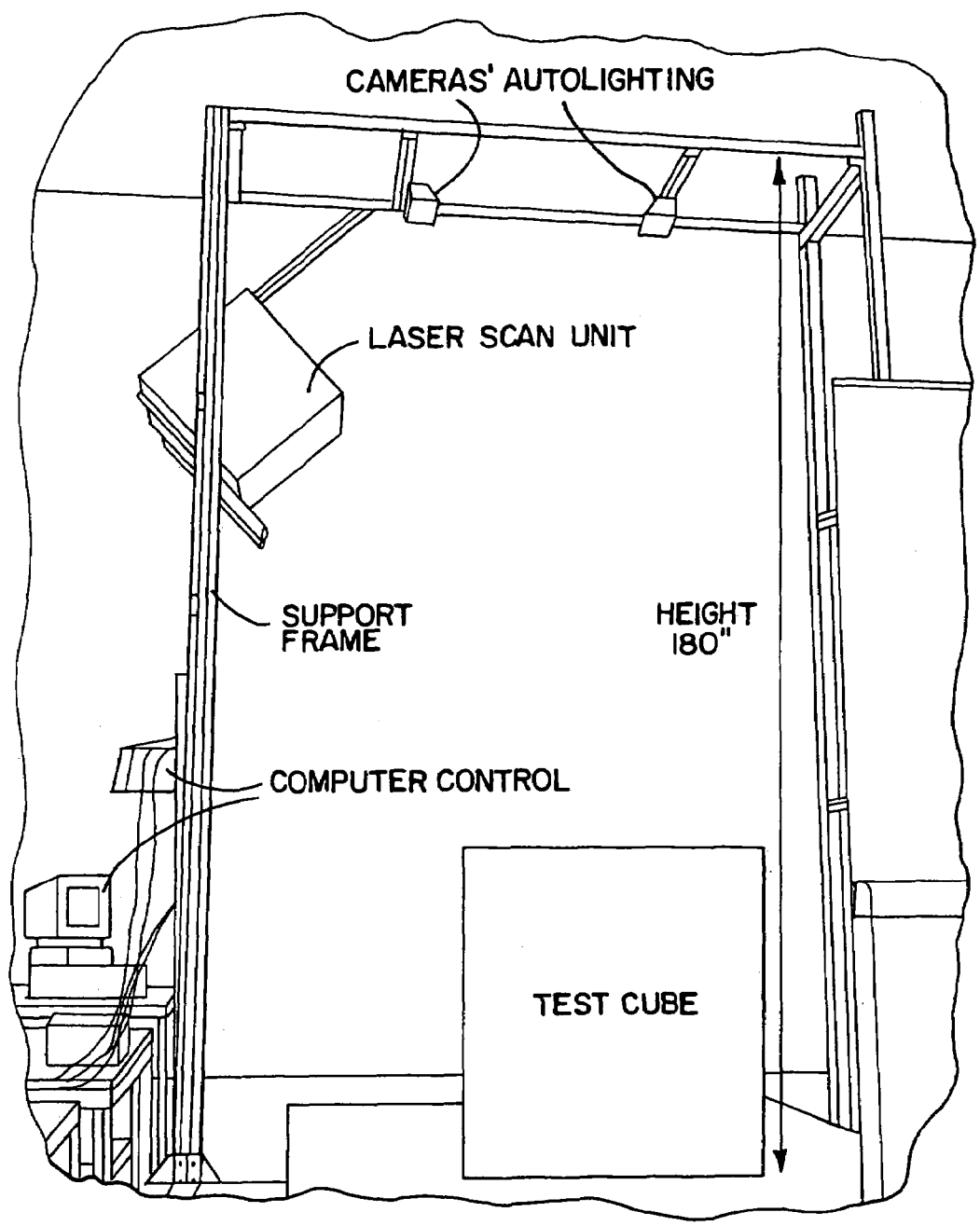
FIG. 29 is a perspective drawing of one embodiment of the hardware configuration of the present invention.

FIG. 29 is an illustration of one embodiment of the dimensioning system hardware. A frame constructed of aluminum supports the laser scanning unit and a camera. The laser control electronics and computer system, including I/O and framegrabber cards, are shown near the left side of the photograph.

Operation of the object measuring system is based upon the concepts and methods described. For the noncuboidal system, the height of the object is continuously determined during the laser scan of the object and then, on completion of the scan, the object's length and width are determined. In total, a cloud of 442,368 three-dimensional data points are typically acquired during a single scan. By calculating the object's height during the scan, it is possible to selectively remove low-lying points, often representing a pallet, from the point cloud data. The dimensioning system incorporates a short focal length lens (6.5 mm) to allow objects ranging in size from 12 in.$^3$ to 96 H×72 L×72 W in. to be measured using a system height of only approximately 186 inches. The camera utilizes a narrow band interference filter to eliminate ambient light.

The system 10 was implemented by employing a program written using National Instrument's CV1 software, a C-based programming language that incorporates specialized functions for data and image acquisition and processing. In determining the dimensions of a cubodial object, the dimensioning system utilizes a saw-tooth waveform generator (with a suitable I/O card) to produce an analog voltage. At specified intervals, the voltage is sent to the scanner electronics and used to drive the mirror to a known position. A "framegrabber" is then used to grab an image using the CCD camera attached to the system. The capture of an image while the mirror (and therefore line) is momentarily stationary reduces and/or eliminates any possible errors caused by movement. The image is subtracted from a previous image and then thresholded to produce a binary image. The height of each point is calculated using the previously described methods. The points of all scans are combined into a new image "cloud."

During determination of the dimensions of a noncuboidal object, the dimensioning system continually calculates the height of all three-dimensional pixel points during the laser sweep of the measuring volume. This allows any background objects, such as a pallet or any markings on the floor, etc., to be removed from the cubing task. For example, the system may delete all pixels below 6 cm in height. As shown schematically in FIG. 30, the remaining pixels are accumulated to form a three-dimensional cloud of data points representing the surface of the scanned object(s). Object maximum and average height are calculated during the laser sweep. Object length and width are calculated by fitting a "minimum enclosing rectangle" to a plan view of the data point cloud, as shown in FIG. 31.

Determination of the minimum enclosing rectangle is acquired by using the earlier-described techniques, see FIG. 6, in which the enclosing rectangle is effectively rotated through a series of angular increments, e.g., 3°, until the smallest, in terms of area, enclosing rectangle is found. The smallest dimension, i.e., object width, and the dimension perpendicular to this, i.e., object length, are found. Although the enclosing rectangle will have the smallest width, rectangle A in FIG. 32, it may not have the smallest area. Alternatively, the solution may be to find the enclosing rectangle with the smallest area, rectangle B in FIG. 32.

The system 10 of the present invention is able to accurately determine the height of any object. This is due to the geometrical analysis and calculations that were performed to take into account the effects of parallax and perspective.

In one embodiment of the present system, height data is continuously calculated and used to find the maximum and average height values during the laser scanning cycle. The maximum height is sensitive to disturbance from noisy outliers and may cause a reduction in measurement accuracy. Alternatively, the point cloud data can be accumulated and stored during the laser scan and then subsequently analyzed. A further advantage allows a three-dimensional cloud of data points to be displayed with the minimum-enclosing cube superimposed, offering better visualization of the cubing task. Outliers and noise can be more readily deleted from the body of acquired data, possibly using global methods such as erosion and dilation. The duration of the scan could further be reduced by only considering pixels at or behind the advancing scan line, i.e., floor level. Time taken for the analysis of the data itself could also be improved by only considering object edge or boundary pixels during the cubing of the point cloud data.

In general terms, the more distant the lasers and cameras from the object, the greater the tendency toward orthographic project. While this helps to reduce occlusion, the laser signal will tend to be reduced in intensity, and the system accuracy reduced. Similarly, positioning the laser and camera units in close proximity will also tend to reduce occlusion, but at the cost of a reduction in system accuracy.

Figure 33:
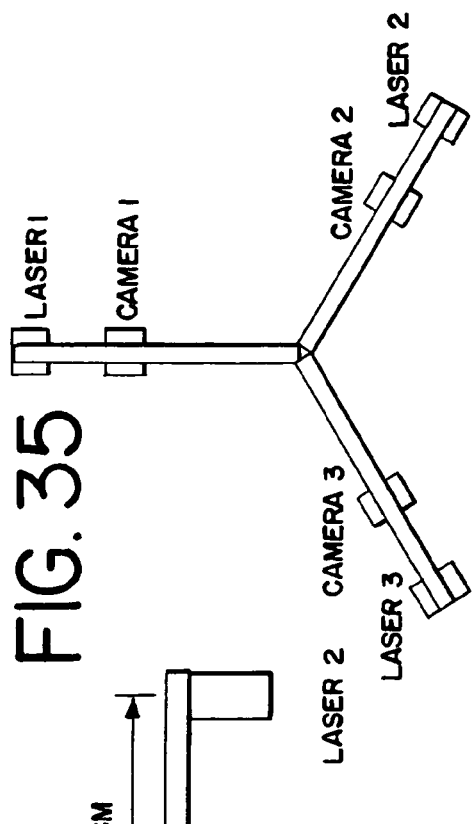
FIG. 33 is a front view of one embodiment of the dimensioning system of the present invention.

These issues can be addressed by utilizing appropriate subsystem configurations of the present invention. FIG. 33 depicts an alternate embodiment of the dimensioning system's hardware configuration adopted for the reduced laser and camera occlusion, sometimes referred to as shadowing. This arrangement represents a compromise in terms of minimizing camera and laser occlusion while simultaneously offering reasonably optimized dimensional recovery accuracy when combined with the lookup table calibration approach previously described. By locating the laser units outside the cameras, the lasers tend towards an ideal collimated source, helping to minimize possible occlusions off to one side, i.e., away from the axis of the horizontal mounting rail.

In terms of hardware, there are now two subsystems, i.e., there are two cameras and two lasers. However, from an operational standpoint, there are actually four subsystems available. Table 1 lists the hardware components of the four operational subsystems.

TABLE 1

| Subsystem | Laser | Camera |
|---|---|---|
| 1A | 1 | 1 |
| 1B | 2 | 1 |
| 2A | 2 | 2 |
| 2B | 1 | 2 |

Together, the four subsystems offer differing operational characteristics that the controlling software may call upon during a given measurement cycle. For example, subsystems 1A and 2A behave as the existing overhead dimensioning system but with differing fields of view. When operating together, for an object positioned centrally below, they are able to reduce the problem of laser and camera occlusion. The accuracy of subsystems 1A and 2A can be improved across the field of view by the addition of the lookup table calibration approach. Alternatively, subsystems 1B and 2B have a much greater baseline separation and are thus able to offer significantly improved accuracy of height determination, although at the cost of increased laser occlusion.

It can be observed that the determination of the object's maximum height does not suffer from the problem of occlusion; therefore, subsystems 1B and 2B are able to provide increased accuracy for this purpose. On the other hand, subsystems 1A and 2A have the ability to recover occluded areas and thereby improve accuracy in the determination of the object's length and breadth. Thus, the subsystems offer a hybrid approach to the dimensioning system.

Generally, objects to be dimensioned are nominally placed on a floor mark, i.e., measurement space, located centrally between the two cameras. The central placement reduces occlusion issues, although objects located between and at the periphery of both camera fields of view can be disadvantageous due to radial lens distortion, with any registration errors being more significant.

The dimensioning process begins by scanning laser 1 rapidly through the measurement space. During the rapid scan, cameras 1 and 2 determine the approximate location and extent of the object. Laser 1 is scanned over the object and cameras 1 and 2 (subsystems 1A and 2B) acquire point cloud data simultaneously. Laser 2 is scanned over the object and cameras 1 and 2 (subsystems 1B and 2A) acquire point cloud data simultaneously. The point cloud data acquired by the subsystems is merged and fit in a cuboid. It is to be understood that the acquisition of point cloud data can be attained by multiplexing these steps to gain a speed advantage. Furthermore, it may also be possible to apply a transformation when merging the cloud data to accommodate any misregistration.

Figure 34:
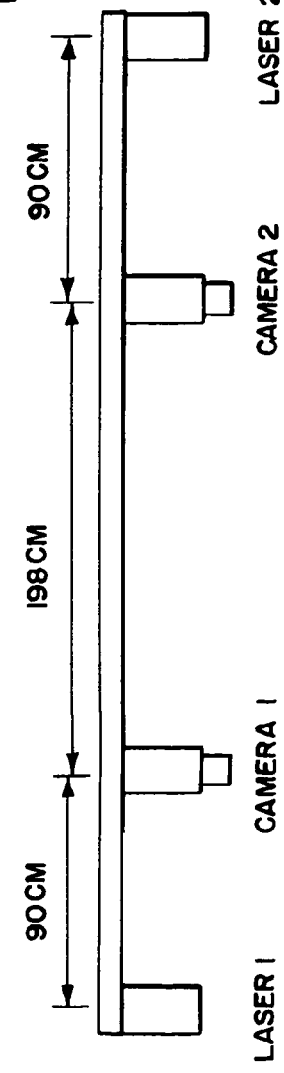
FIG. 34 is a front view of another embodiment of the present invention shown in FIG. 33.

To combat accuracy errors, e.g., distortion or misregistration, arising from objects placed between the cameras near the periphery and between the two fields of view, the configuration shown in FIG. 33 can be arranged as shown in FIG. 34 wherein the cameras are pointed toward the central object location. In this configuration, it is necessary to perform transformations upon the acquired point cloud data to map data acquired in the local coordinate frames to a common world coordinate frame. However, to provide the same combined field of view (with reduced occlusion) as obtained with parallel optical axes, the camera spacing should be increased. Also, to avoid a reduction in accuracy caused by a reduction in camera-to-laser separation, the lasers can be further separated, although this may result in a fall-off of reflected intensity. Because both cameras have a view of much of the object, a stereo vision approach can be incorporated.

Figure 35:
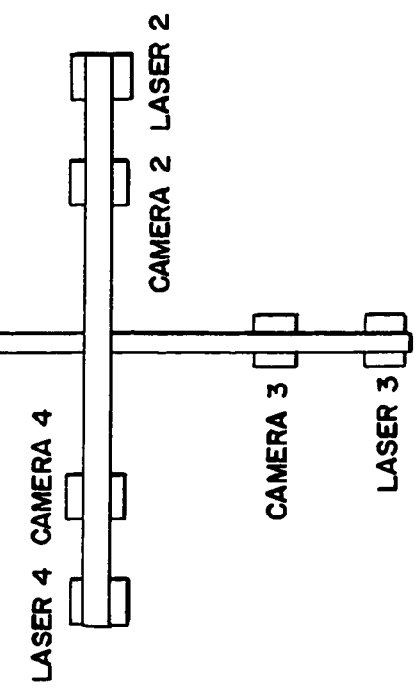
FIG. 35 is a top view of one embodiment of the dimensioning system of the present invention.
Figure 36:
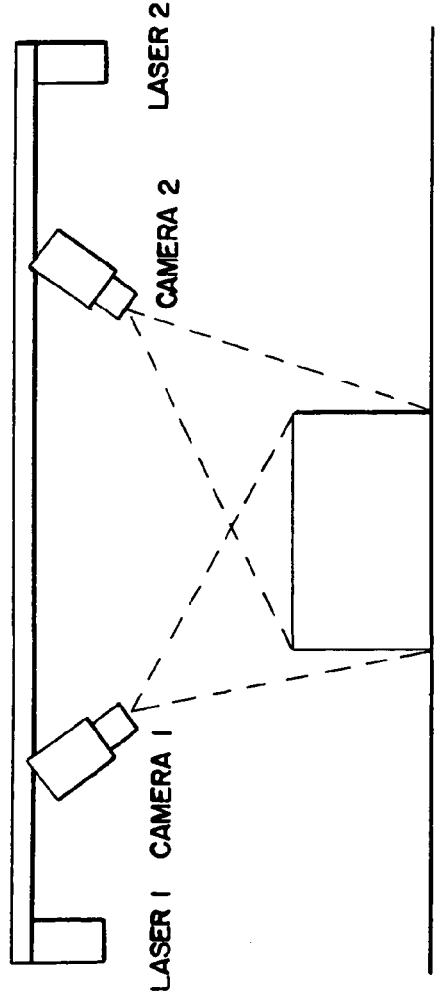
FIG. 36 is a top view of one embodiment of the dimensioning system of the present invention.

Another embodiment of the present invention shown in FIG. 36 can significantly reduce occlusion by utilizing a four camera-laser system setup configured in 90° increments. A less costly configuration is shown in FIG. 35 and incorporates a three camera-laser system setup arranged in 120° increments with the local data mapped to a world coordinate frame.

While the specific embodiments have been illustrated and described, numerous modifications come to mind without significantly departing from the spirit of the invention, and the scope of protection is only limited by the scope of the accompanying claims.

We claim:

1. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   utilizing a second laser and a second camera to determine an approximate location and a dimension of the at least one item;
   acquiring a second set of point cloud data by utilizing the second laser to transmit a second signal over the at least one item and utilizing the second camera to receive a reflection of the second signal;
   acquiring a third set of point cloud data by utilizing the second camera to receive the reflection of the first signal;
   constructing a three-dimensional image that defines the at least one item by merging the acquired first, second and third sets of point cloud data; and
   determining a rectangular prism having a height, length and breadth to contain the constructed image defining the at least one item to ascertain the rectangular prism within which the at least one item will fit.

2. The method of claim 1, further comprising:
   acquiring a fourth set of point cloud data by utilizing the first camera to receive the reflection of the second signal; and
   constructing the three-dimensional image that defines the at least one item by merging the acquired first, second, third, and fourth sets of point cloud data.

3. The method of claim 1, further comprising:
   transforming the constructed image to a global coordinate system.

4. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data;
   compensating for lens distortion of the constructed three-dimensional image comprising utilizing a pixel point correction value in cooperation with the acquired first set of point cloud data to adjust a location of each pixel point affected by radial lens distortion, the pixel point correction value being developed at least in part by:
      providing a pixel value for a pixel within the measurement space;
      acquiring a scanned pixel value by utilizing the first laser to transmit the first signal over the measurement space and utilizing the first camera to receive a reflection off a pixel of the first signal;
      comparing the pixel value with the scanned pixel value; and
      generating a pixel correction value in response to the comparison; and
   determining a rectangular prism having a height, length, width and breadth and, as compensated for lens distortion, to contain the constructed image defining the at least one item to ascertain the rectangular prism within which the at least one item will fit.

5. The method of claim 4, further comprising:
   storing the pixel correction value in a calibration lookup table, wherein the pixel correction value can be utilized during construction of the three-dimensional image.

6. The method of claim 4, further comprising:
   utilizing the pixel correction value to generate an equation for correcting distortions.

7. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data;
   reducing noise from the image utilizing image subtraction by:
      acquiring a first image that represents the at least one item by utilizing the first laser to transmit the first signal over the measurement space and utilizing the first camera to receive the reflection of the first signal;
      acquiring a second image that represents the at least one item by utilizing the first laser to transmit the first signal over the measurement space and utilizing the first camera to receive the reflection of the first signal;
      subtracting the second image from the first image to produce a gray-level image; and
      utilizing the gray-level image as a threshold value for providing a binary image; and
   determining a rectangular prism having a height, length and breadth to contain the constructed image, after noise reduction therefrom, defining the at least one item to ascertain the rectangular prism within which the at least one item will fit.

8. The method of claim 7, wherein reducing noise comprises:
   determining a median pixel value for a predetermined area surrounding a pixel; and
   setting each pixel to its respective median pixel value.

9. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data;
   reducing noise from the image, comprising:
      computing a spatial histogram of the point cloud data in a vertical direction;
      computing a spatial histogram of the point cloud data in a horizontal direction;
      grouping points having a spatially detached value;
      comparing an amount of points in a grouping against a predetermined value;
      identifying each grouping having a lesser amount of points than the predetermined value; and
      removing each identified grouping; and
   determining a rectangular prism having a height, length and breadth to contain the constructed image, after noise reduction therefrom, defining the at least one item to ascertain the rectangular prism within which the at least one item will fit.

10. The method of claim 9, wherein reducing noise further comprises:
    computing the vertical spatial histogram from rotation of the point cloud data in an x-plane; and
    computing the horizontal spatial histogram from rotation of the point cloud data in a y-plane.

11. A method for determining the dimensions of at least one item, the method comprising:
    determining an approximate location and extent of at least one item;
    acquiring a first set of point cloud data by utilizing a first laser to transmit a first signal over the at least one item and utilizing a first camera to receive a reflection of the first signal;
    constructing a three-dimensional image that defines the at least one item from the acquired first set of point cloud data;
    reducing noise from the image, comprising:
       identifying points in a point cloud, each point having a height;
       grouping the points by the height of each point;
       comparing an amount of points in each grouping against a predetermined value;
       identifying each grouping having a lesser amount of points than the predetermined value; and
       removing each identified grouping; and
    determining a rectangular prism having a height, length and breadth to contain the constructed image, after noise reduction therefrom, defining the at least one item to ascertain the rectangular prism within which the at least one item will fit.

12. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data;
   reducing noise from the image, comprising:
      identifying a position of each disjoint point in a measurement array;
      comparing a height value of each disjoint point against a height value of a surrounding signal; and
      removing each disjoint point not matching the height value of the surrounding signal; and
   determining a rectangular prism having a height, length and breadth to contain the constructed image, after noise reduction therefrom, defining the at least one item to ascertain the rectangular prism within which the at least one item will fit.

13. A method for determining the dimensions of at least one item place within a measurement space, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data including utilizing a point threshold in cooperation with the image during construction of the image; and
   determining a rectangular prism having a height, length and breadth to contain the constructed image defining the at least one item to ascertain the rectangular prism within which the at least one item will fit.

14. The method of claim 13, further comprising:
   identifying a gray-scale value for each acquired point;
   utilizing each identified point to determine a statistical property of the gray-scale value; and
   defining the point threshold in response to the determined statistical property of the gray-scale value.

15. The method of claim 13, further comprising:
   providing a group of point threshold values from which to select the point threshold.

16. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal;
   constructing a three-dimensional image that defines the at least one item from the acquired first set of point cloud data; and
   determining a rectangular prism to contain the constructed image, the rectangular prism having a height, length, and breadth, wherein determining comprises:
      determining dimensions of the rectangular prism by rotating a coordinate frame about a centroid of the constructed image through a plurality of angular increments;
      measuring a distance from the centroid to an edge of the at least one item for each angular increment;
      storing each measurement;
      identifying a length measurement and a breadth measurement; and
      selecting a single length measurement and a single breadth measurement, wherein the selected measurements, in combination with a determined height of the at least one item, comprise dimensions of a rectangular prism having the smallest volume which would contain the at least one item.

17. A method for determining the dimensions of at least one item, the method comprising:
   determining an approximate location and extent of at least one item;
   acquiring a first set of point cloud data by utilizing a first laser to transmit a first signal over the at least one item and utilizing a first camera to receive a reflection of the first signal, wherein acquiring a first set of point cloud data comprises:
      coarsely transmitting the first signal in a first direction at an off-center location within the measurement space;
      identifying a first edge of the at least one item;
      finely transmitting the first signal in a second direction over the first edge, the second direction being opposite the first direction;
      coarsely transmitting the first signal in the second direction at the off-center location within the measurement space;
      identifying a second edge of the at least one item; and
      finely transmitting the first signal in the first direction over the second edge;
   constructing a three-dimensional image that defines the at least one item from the acquired first set of point cloud data; and
   determining a rectangular prism having a height, length and breadth to contain the constructed image defining the at least one item to ascertain the rectangular prism within which the at least one item will fit.

18. A system for determining the dimensions of at least one item set within a measurement space, the system comprising:
   a first laser located and oriented for transmitting a first signal through a measurement space within which at least one item may reside, the first laser having a coarse transmission mode and a fine transmission mode;
   a first camera located and oriented for receiving the first signal and acquiring a plurality of data points comprising a first set of point cloud data from reflections of the first signal from the at least one item;
   an array generator for constructing an image from the acquired first set of point cloud data; and
   a rectangular prism generator for constructing a rectangular prism in response to dimensions of the constructed image.

19. The system of claim 18, further comprising:
   a lens distortion compensator for compensating for lens distortion of the constructed image.

20. The system of claim 19, wherein the lens distortion compensator is configured to determine an image point correction factor during calibration of the system for use in cooperation with the acquired first set of point cloud data to adjust a location of each image point affected by radial lens distortion.

21. The system of claim 18, further comprising:
a noise filter.

22. The system of claim 21, wherein the noise filter is configured to determine:
a median pixel value by an area surrounding a pixel; and
further comprising a designator for setting each pixel to its respective median pixel value.

23. The system of claim 21, wherein the noise filter is configured to generate:
a vertical spatial histogram of the acquired first set of cloud point data from rotation of the acquired first set of point cloud data in a vertical direction;
a horizontal spatial histogram of the acquired first set of point cloud data from rotation of the acquired first set of point cloud data in a horizontal direction; and
further comprising a grouper for grouping points having a spatially detached value, wherein each group having a lesser amount of points than a predetermined value is removed from the image.

24. The system of claim 21, wherein the noise filter comprises:
an identifier for identifying points in a point cloud, each point having a height;
a grouper for grouping the points by the height of each point; and
a comparator for comparing an amount of points in each group against a predetermined value, wherein each group having a lesser amount of points than a predetermined value is removed.

25. The system of claim 21, wherein the noise filter comprises:
an identifier for identifying a position of each disjoint point in a measurement image; and
a comparator for comparing a height value of each disjoint point against a height value of a surrounding signal;
wherein each disjoint point not matching the height value of the surrounding signal is removed.

26. The system of claim 18, further comprising:
means for determining a point threshold by:
identifying a gray-scale value for each point found in an image;
utilizing each identified point to determine a statistical property of the gray-scale value; and
selecting the point threshold in response to the determined statistical property of the gray-scale value.

27. The system of claim 26, further comprising:
means for generating a group of point threshold values from which to select the point threshold in response to calibration of the system.

28. The system of claim 18, further comprising:
a second laser located and oriented for transmitting a second signal through the measurement space, the second laser having a coarse transmission mode and a fine transmission mode;
a second camera located and oriented for receiving the second signal and acquiring a plurality of data points comprising a second set of point cloud data from reflections of the second signal from the at least one item; and
wherein the array generator is configured to utilize the acquired first and second sets of point cloud data to construct the image.

29. The system of claim 28, wherein the second camera is located and oriented for acquiring a plurality of data points comprising a third set of point cloud data from reflections of the first signal from the at least one item and wherein the array generator is configured to utilize the acquired first, second, and third sets of point cloud data to construct the image.

30. The system of claim 29, wherein the first camera is located and oriented for acquiring a plurality of data points comprising a fourth set of point cloud data from reflections of the second signal from the at least one item and wherein the array generator is configured to utilize the acquired first, second, third, and fourth sets of point cloud data to construct the image.

31. The system of claim 30, further comprising:
a third laser located and oriented for transmitting a third signal through the measurement space, the third laser having a coarse transmission mode and a fine transmission mode;
a third camera located and oriented for receiving the third signal and acquiring a plurality of data points comprising a fifth set of point cloud data from reflections of the third signal from the at least one item and wherein the array generator is configured to utilize the acquired first, second, third, fourth, and fifth sets of point cloud data to construct the image.

32. The system of claim 31, wherein the third camera is located and oriented for acquiring a plurality of data points comprising a sixth set of point cloud data from reflections of the first signal from the at least one item and wherein the array generator is configured to utilize the acquired first, second, third, fourth, fifth, and sixth sets of point cloud data to construct the image.

33. The system of claim 32, wherein the third camera is located and oriented for acquiring a plurality of data points comprising a seventh set of point cloud data from reflections of the second signal from the at least one item and wherein the array generator is configured to utilize the acquired first, second, third, fourth, fifth, sixth, and seventh sets of point cloud data to construct the image.

34. The system of claim 33, wherein the first camera is located and oriented for acquiring a plurality of data points comprising an eighth set of point cloud data from reflections of the third signal from the at least one item and wherein the array generator is configured to utilize the acquired first, second, third, fourth, fifth, sixth, seventh, and eighth sets of point cloud data to construct the image.

35. The system of claim 34, wherein the second camera is located and configured for acquiring a plurality of data points comprising a ninth set of point cloud data from reflections of the third signal from the at least one item and wherein the array generator is configured to utilize the acquired first, second, third, fourth, fifth, sixth, seventh, eighth, and ninth sets of point cloud data to construct the image.

36. The system of claim 31, wherein the first, second, and third cameras lie on a first perimeter and the first, second, and third lasers lie on a second perimeter.

37. The system of claim 36, wherein the first, second, and third cameras are spaced 120° about the center of the first perimeter, and the first, second, and third lasers are spaced 120° about the center of the second perimeter.

38. The system of claim 37, wherein the first and second perimeters are concentric circles, respectively, the first circle being contained within the second circle.

39. The system of claim 28, wherein the first camera and the first laser lie on a first axis and the second camera and the second laser lie on a second axis.

40. The system of claim 39, wherein the first and second axes are parallel.

41. The system of claim 40, wherein both the first camera and the second camera are located between the first laser and the second laser.

42. A computer-readable medium having an application therein to facilitate dimensioning of at least one item, the medium comprising:
 a segment for determining an approximate location and extent of at least one item;
 a segment for acquiring a first set of point cloud data by utilizing a first laser to transmit a first signal over the at least one item and utilizing a first camera to receive a reflection of the first signal from the at least one item;
 a segment for utilizing a second laser and a second camera to determine the approximate location and a dimension of the at least one item;
 a segment for acquiring a second set of point cloud data by utilizing the second laser to transmit a second signal over the at least one item and utilizing the second camera to receive a reflection of the second signal from the at least one item;
 a segment for acquiring a third set of point cloud data by utilizing the second camera to receive the reflection of the first signal from the at least one item;
 a segment for constructing an image defining the at least one item by merging the acquired first, second, and third sets of point cloud data; and
 a segment for determining a rectangular prism having a height, length and breadth to contain a constructed image defining the at least one item to ascertain the rectangular prism within which the at least one item will fit.

43. A computer-readable medium having an application therein to facilitate dimensioning of at least one item, the medium comprising:
 a segment for determining an approximate location and extent of at least one item;
 a segment for acquiring a first set of point cloud data by utilizing a first laser to transmit a first signal over the at least one item and utilizing a first camera to receive a reflection of the first signal from the at least one item;
 a segment for constructing an image defining the at least one item from the acquired first set of point cloud data;
 a segment for reducing noise from the constructed image, comprising:
  a segment for identifying points in a point cloud, each point having a height;
  a segment for grouping the points by the height of each point;
  a segment for comparing an amount of points in each grouping against a predetermined value;
  a segment for identifying each grouping having a lesser amount of points than the predetermined value; and
  a segment for removing each identified grouping; and
 a segment for determining a rectangular prism having a height, length and breadth to contain a constructed image, after noise reduction therefrom, defining the at least one item to ascertain the rectangular prism within which the at least one item will fit.

44. The medium of claim 42, further comprising:
 a segment for compensating for lens distortion of the constructed image.

45. The medium of claim 44, wherein the segment for compensating for lens distortion comprises:
 a segment for utilizing an image point correction factor in cooperation with the acquired first set of point cloud data to adjust a location of each image point affected by radial lens distortion.

46. The medium of claim 45, further comprising:
 a segment for storing the image point correction factor in a calibration lookup table, wherein the image point correction factor is associated with an image point location.

47. The medium of claim 42, further comprising:
 a segment for utilizing a point threshold during construction of the image.

48. The medium of claim 47, further comprising:
 a segment for identifying a gray-scale value for each acquired point;
 a segment for utilizing each identified point to determine a statistical property of the gray-scale value; and
 a segment for defining the point threshold in response to the determined statistical property of the gray-scale value.

49. The medium of claim 47, further comprising:
 a segment for providing a group of point threshold values from which to select the point threshold.

50. The medium of claim 42, further comprising:
 a segment for transforming the constructed image to a global coordinate system.

51. A computer-readable medium having an application therein to facilitate dimensioning of at least one item, the medium comprising:
 a segment for determining an approximate location and extent of at least one item;
 a segment for acquiring a first set of point cloud data by utilizing a first laser to transmit a first signal over the at least one item and utilizing a first camera to receive a reflection of the first signal from the at least one item;
 a segment for constructing an image defining the at least one item from the acquired first set of point cloud data;
 a segment for reducing noise from the constructed image, comprising:
  a segment for computing a spatial histogram of the point cloud data in a vertical direction;
  a segment for computing a spatial histogram of the point cloud data in a horizontal direction;
  a segment for grouping points having a spatially detached value;
  a segment for comparing an amount of points in a grouping against a predetermined value;
  a segment for identifying each grouping having a lesser amount of points than the predetermined value; and
  a segment for removing each identified grouping; and
 a segment for determining a rectangular prism having a height, length and breadth to contain a constructed image, after noise reduction therefrom, defining the at least one item to ascertain the rectangular prism within which the at last one item will fit.

52. The medium of claim 51, wherein the segment for reducing noise comprises:
 a segment for determining a median pixel value for a predetermined area surrounding a pixel; and
 a segment for setting each pixel to its respective median pixel value.

53. The medium of claim 42, further comprising:
 a segment for acquiring a fourth set of point cloud data by utilizing the first camera to receive the reflection of the second signal from the at least one item; and a segment for constructing the image by merging the acquired first, second, third, and fourth sets of point cloud data.

54. A computer-readable medium having an application therein to facilitate dimensioning of at least one item, the medium comprising:
   a segment for determining an approximate location and extent of at least one item;
   a segment for acquiring a first set of point cloud data by utilizing a first laser to transmit a first signal over the at least one item and utilizing a first camera to receive a reflection of the first signal from the at least one item;
   a segment for constructing an image of the at least one item from the acquired first set of point cloud data;
   a segment for reducing noise from the constructed image, comprising:
      a segment for identifying a position of each disjoint point in a measurement array;
      a segment for comparing a height value of each disjoint point against a height value of a surrounding signal; and
      a segment for removing each disjoint point not matching the height value of the surrounding signal; and
   a segment for determining a rectangular prism having a height, length and breadth to contain a constructed image, after noise reduction therefrom, of the at least one item to ascertain the rectangular prism within which the at least one item will fit.

55. A computer-readable medium having an application therein to facilitate dimensioning of at least one item, the medium comprising:
   a segment for determining an approximate location and extent of at least one item;
   a segment for acquiring a first set of point cloud data by utilizing a first laser to transmit a first signal over the at least one item and utilizing a first camera to receive a reflection of the first signal from the at least one item;
   a segment for constructing an image of the at least one item from the acquired first set of point cloud data;
   a segment for determining a rectangular prism having a height, length and breadth to contain a constructed image;
   a segment for determining the dimensions of the rectangular prism by rotating a coordinate frame about the centroid of the constructed image through a plurality of angular increments; and
   a segment for measuring a distance from the centroid to an edge of the constructed image for each angular increment;
   a segment for storing each measurement;
   a segment for identifying a length measurement and a breadth measurement; and
   a segment for selecting a single length measurement and a single breadth measurement, wherein the selected measurements, in combination with a determined height of the at least one item, comprise dimensions of a rectangular prism having the smallest volume which would contain the at least one item.

56. A computer-readable medium having an application therein to facilitate dimensioning of at least one item, the medium comprising:
   a segment for determining an approximate location and extent of at least one item;
   a segment for acquiring a first set of point cloud data by utilizing a first laser to transmit a first signal over the at least one item and utilizing a first camera to receive a reflection of the first signal from the at least one item, wherein the segment for acquiring a first set of point cloud data comprises:
      a segment for coarsely transmitting the first signal in a first direction at an off-center location within the measurement space;
      a segment for identifying a first edge of the at least one item;
      a segment for finely transmitting the first signal in a second direction over the first edge, the second direction being opposite the first direction;
      a segment for coarsely transmitting the first signal in the second direction at the off-center location within the measurement space;
      a segment for identifying a second edge of the at least one item; and
      a segment for finely transmitting the first signal in the first direction over the second edge;
   a segment for constructing an image defining the at least one item from the acquired first set of point cloud data; and
   a segment for determining a rectangular prism having a height, length and breadth to contain a constructed image defining the at least one item to ascertain the rectangular prism within which the at least one item will fit.

* * * * *

UNITED STATES PATENT AND TRADEMARK OFFICE
CERTIFICATE OF CORRECTION

PATENT NO. : 7,277,187 B2  Page 1 of 1
APPLICATION NO. : 10/482063
DATED : October 2, 2007
INVENTOR(S) : Melvyn Lionel Smith, Lyndon Smith and Eve Carlsruh It is certified that error appears in the above-identified patent and that said Letters Patent is hereby corrected as shown below:

In the specification:

| | | |
|---|---|---|
| COLUMN 7, | LINE 3, | change "Therefore." to --Therefore,-- |
| COLUMN 11, | LINE 38, | change "FIG. 16." to --FIG. 16,-- |
| COLUMN 11, | LINE 43, | change "pixel. i.e.," to --pixel, i.e.,-- |
| COLUMN 13, | LINE 15, | change "may Generally" to --may generally-- |
| COLUMN 14, | LINE 18, | change "the comers" to --the corners-- |

In the claims:

CLAIM 13, COLUMN 21, LINE 28, change "item place" to --item placed--

Signed and Sealed this

Twenty-first Day of October, 2008

JON W. DUDAS
*Director of the United States Patent and Trademark Office*